US007114388B1

(12) United States Patent
French et al.

(10) Patent No.: US 7,114,388 B1
(45) Date of Patent: Oct. 3, 2006

(54) GEOGRAPHICALLY DISTRIBUTED ENVIRONMENTAL SENSOR SYSTEM

(75) Inventors: Patrick French, Aurora, CO (US);
Brad Veatch, Westminster, CO (US);
Mike O'Connor, Centennial, CO (US)

(73) Assignee: ADA Technologies, Inc., Littleton, CO (US)

( * ) Notice: Subject to any disclaimer, the term of this patent is extended or adjusted under 35 U.S.C. 154(b) by 62 days.

(21) Appl. No.: 10/830,166

(22) Filed: Apr. 21, 2004

Related U.S. Application Data

(60) Provisional application No. 60/464,495, filed on Apr. 21, 2003.

(51) Int. Cl.
*G01W 1/00* (2006.01)
(52) U.S. Cl. .................................. 73/170.16
(58) Field of Classification Search ............. 73/170.16, 73/170.01
See application file for complete search history.

(56) References Cited

U.S. PATENT DOCUMENTS

| 4,313,345 | A |    | 2/1982  | Abele                   |
|-----------|---|----|---------|-------------------------|
| 4,360,345 | A |    | 11/1982 | Hon ................ 434/262 |
| 4,530,069 | A |    | 7/1985  | Desrochers ........ 364/900 |
| 4,654,818 | A |    | 3/1987  | Wetterau, Jr. ..... 364/900 |
| 4,695,955 | A |    | 9/1987  | Faisandier ........ 364/413 |
| 4,715,385 | A |    | 12/1987 | Cudahy et al. .... 128/710 |
| 4,730,247 | A |    | 3/1988  | Takahara .......... 364/560 |
| 4,758,963 | A |    | 7/1988  | Gordon et al. .... 364/481 |
| 4,811,249 | A |    | 3/1989  | Marsh ............... 364/550 |
| 4,885,707 | A |    | 12/1989 | Nichol et al. ... 364/551.01 |
| 4,895,161 | A |    | 1/1990  | Cudahy et al. .... 128/710 |
| 4,916,441 | A |    | 4/1990  | Gombrich .......... 340/712 |
| 4,924,418 | A |    | 5/1990  | Bachman et al. .. 364/550 |
| 5,008,843 | A |    | 4/1991  | Poelsler et al. ... 364/571.02 |
| 5,089,979 | A |    | 2/1992  | McEachern et al. ... 364/571.04 |
| 5,099,437 | A |    | 3/1992  | Weber ............... 364/550 |
| 5,202,817 | A |    | 4/1993  | Koenck et al. .... 361/393 |
| 5,206,818 | A |    | 4/1993  | Speranza .......... 364/550 |
| 5,225,996 | A |    | 7/1993  | Weber ............... 364/550 |
| 5,227,988 | A |    | 7/1993  | Sasaki et al. ..... 364/709.01 |
| 5,249,863 | A |    | 10/1993 | Brown .............. 374/102 |
| 5,347,476 | A | *  | 9/1994  | McBean, Sr. ....... 702/91 |
| 5,357,795 | A |    | 10/1994 | Djorup                  |

(Continued)

FOREIGN PATENT DOCUMENTS

WO  WO 96/01411   1/1996

OTHER PUBLICATIONS

Barnett et al; "Determination of Parts-per-Trillion Levels of Chlorate, Bromate, and Iodate by Electrospray Ionization/High-Field Asymmetric Waveform Ion Mobility Spectrometry/Mass Spectrometry"; *Applied Spectroscopy*; (1999) vol. 53, No. 11; pp. 1367-1374.

(Continued)

*Primary Examiner*—Edward Lefkowitz
*Assistant Examiner*—Andre Allen
(74) *Attorney, Agent, or Firm*—Sheridan Ross P.C.

(57) ABSTRACT

The present invention is directed to a sensor network that includes a number of sensor units and a base unit. The base station operates in a network discovery mode (in which network topology information is collected) in a data polling mode (in which sensed information is collected from selected sensory units). Each of the sensor units can include a number of features, including an anemometer, a rain gauge, a compass, a GPS receiver, a barometric pressure sensor, an air temperature sensor, a humidity sensor, a level, and a radiant temperature sensor.

54 Claims, 26 Drawing Sheets

U.S. PATENT DOCUMENTS

| | | | |
|---|---|---|---|
| 5,375,604 A | 12/1994 | Kelly et al. | 128/671 |
| 5,509,295 A | 4/1996 | Bartoli | |
| 5,526,287 A | 6/1996 | French | 364/550 |
| H1688 H | 11/1997 | Lake et al. | |
| 5,714,691 A * | 2/1998 | Hill | 73/861.04 |
| 5,783,745 A | 7/1998 | Bergman | |
| 5,839,094 A | 11/1998 | French | 702/91 |
| 5,920,827 A | 7/1999 | Baer et al. | |
| 6,097,703 A | 8/2000 | Larsen et al. | |
| 2003/0117297 A1* | 6/2003 | Obradovich et al. | 340/905 |
| 2005/0051669 A1* | 3/2005 | Heller et al. | 244/136 |

OTHER PUBLICATIONS

Carnahan et al.; "Development and Applications of a Transverse Field Compensation Ion Mobility Spectrometer"; *Mines Safety Appliances Company*; date unknown 20 pp.

Carnahan et al.; "Field Ion Spectrometry—A New Analytical Technology for Trace Gas Analysis"; *ISA*; (1996) Paper #96-009; pp. 87-96.

Carter et al.; "Emergence of Real Casualties During Simulated Chemical Warfare Training Under High Heat Conditions"; *Military Medicine*; (Dec. 1985) vol. 150, No. 12; pp. 657-663.

Cole; "Heat Stroke During Training with Nuclear, Biological, and Chemical Protective Clothing: Case Report"; *Military Medicine*, (Jul. 1983) vol. 148; pp. 624-625.

DeVol et al.; "Isotopic Analysis of Plutonium Using a Combination of Alpha and Internal Conversion Electron Spectroscopy", *Journal of Radioanalytical and Nuclear Chemistry*; (2002) vol. 254, No. 1; pp. 71-79.

DeVol et al.; "Extractive Scintillating Resin for $^{99}$Tc Quantification in Aqueous Solutions" *Journal of Radioanalytical and Nuclear Chemistry*, (2001) vol. 249, No. 1; pp. 181-189.

Guevremont et al.; "Atmospheric Pressure Ion Focusing in a High-Field Asymmetric Waveform Ion Mobility Spectrometer"; *Review of Scientific Instruments*; (Feb. 1999) vol. 70, No. 2; pp. 1370-1383.

Guevremont et al.; "High Field Asymmetric Waveform Ion Mobility Spectrometry-Mass Spectrometry: An Investigation of Leucine Enkephalin Ions Produced by Electrospray Ionization"; *American Society for Mass Spectrometry*; (1999) vol. 10; pp. 492-501.

Guevremont et al.; "Ion Trapping at Atmospheric Pressure (760 Torr) and Room Temperature with a High-Field Asymmetric Waveform Ion Mobility Spectrometer"; *Elsevier Science, International Journal of Mass Spectrometry*; (1999) vol. 193; pp. 45-56.

Hughes et al.; "On-line Gross Alpha Radiation Monitoring of Natural Waters with Extractive Scintillating Resins" *Elsevier Science, Nuclear Instruments and Methods in Physics Research, Section A*, (2003) 505; pp. 435-438.

Matthew et al., "Integration of a Heat Strain Prediction Model with Army Weather Data Resources"; *U.S. Army Research Institute of Environmental Medicine*, date unknown pp. 479-485.

Matthew et al., "Integration of Weather Effects Models with Real-Time Physiological Measurements in the Dismounted Infantry Battlespace"; *U.S. Army Research Institute of Environmental Medicine*; date unknown pp. 653-660.

Miller et al., "A MEMS Radio-Frequency Ion Mobility Spectrometer for Chemical Vapor Detection"; *Elsevier Science, Sensors and Actuators, Section A*; (2001) 91; pp. 307-318.

Purves et al.; "Electrospray Ionization High-Field Asymmetric Waveform Ion Mobility Spectrometry—Mass Spectrometry"; *Analytical Chemistry*; (Jul. 1, 1999) vol. 71; pp. 2346-2357.

Purves et al.; "Mass Spectrometric Characterization of a High-Field Asymmetric Waveform Ion Mobility Spectrometer"; *Review of Scientific Instruments*; (Dec. 1998) vol. 69, No. 12; pp. 4094-4105.

Santee et al.; "Effects of Meteorological Parameters on Adequate Evaluation of the Thermal Environment"; *J. Therm. Biol.*; (1994) vol. 19, No. 3; pp. 187-198.

Stauffer et al.; "A Field-Coherence Technique for Meteorological Field-Program Design for Air Quality Studies. Part I: Description and Interpretation"; *Journal of Applied Meteorology*, (Mar. 2000) vol. 39; pp. 297-316.

Stauffer et al.; "Multiscale Four-Dimensional Data Assimilation"; *Journal of Applied Meteorology*; (Mar. 1994) vol. 33, pp. 416-434.

Tanrikulu et al.; "A Field-Coherence Technique for Meteorological Field-Program Design for Air Quality Studies. Part II: Evaluation in the San Joaquin Valley"; *Journal of Applied Meteorology*, (Mar. 2000) vol. 39, pp. 317-334.

Award/Contract No. DAMD17-00-C-0010; Issued by U.S. Army Medical Research Acquisition Activity, Director, 820 Chandler Street, Fort Detrick, MD 21702-5014; Contractor: Martin J. Mastroianni, VP, Technology Programs, ADA Technologies, Inc., 304 Inverness Way South, Suite 365, Englewood, CO 80112, Dec. 17, 1999; 36 pp.

Technical Abstract—SBIR Phase II Project; 2000; 1 p.

Weather Station Phase I Published Abstract; 2000; 1 p.

Omegg Engineering Sales Literature for Portable dataloggers, pp. F-83 to F-90 & F-97, 1991.

Sales literature, Rustrak Ranger II Data Logger, Jul. 1990.

Sales literature, Philip Harris, 1992.

DOE Abstract for DOE Grant No. DE-FG02-93ER81585, Nov. 1992.

Sales literature, Texas Instruments, Jan. 1994.

Sales literature, Micro Data Logger, 1993.

ADA Technologies, Inc., "Abstracts," vol. XIII, No. 1 (Spring 2003), pp. 1-6.

"Meteorological Instrumentation," Environmental Protection (printed Apr. 20, 2004), available at http://www.eponline.com/Stevens/EPPub.nsf/ProductView2?OpenForm&category=Meteo . . . , pp. 1-3.

Climatronics Corporation Sales Literature, "TACMET II Weather Sensor (EMI), 102304," (Mar. 18, 2003), 2 pages.

Declaration of Patrick French

* cited by examiner

| Sensor Unit | Branch | Next Scheduled Communication | Neightbor List |
|---|---|---|---|
| 1 | 1 | 1:30 pm | 2<br>3<br>4 |
| 2 | 1 | 1:30 pm | 1<br>3<br>4 |
| 3 | 1 | 1:30 pm | 1<br>2<br>4 |
| 4 | 1 | 1:30 pm | 1<br>2<br>3 |
| ⋮ | ⋮ | ⋮ | ⋮ |
| N | N | 3:00 pm | X<br>Y<br>Z |

GEOGRAPHICALLY DISTRIBUTED ENVIRONMENTAL SENSOR SYSTEM

CROSS REFERENCE TO RELATED APPLICATIONS

The present application claims priority from U.S. Provisional Application Ser. No. 60/464,495, filed Apr. 21, 2003, entitled "GEOGRAPHICALLY DISTRIBUTED ENVIRONMENTAL SENSOR SYSTEM", which is incorporated herein by this reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DOD DAMD 17-00-C0010 and DOD NAVC N00164-02-C-6007 both awarded by the U.S. Department of Defense and Contract No. DE-FG02-03ER 83590 awarded by the Department of Energy.

FIELD OF THE INVENTION

The present invention relates generally to environmental sensing devices and specifically to networked environmental sensing devices.

BACKGROUND OF THE INVENTION

Monitoring of environmental conditions is becoming an increasingly important activity. Pollutants, such as gas and/or liquid emissions, are being subjected to higher levels of scrutiny by state and federal agencies. Policing emissions often requires continual monitoring of the environment for unlawful emission levels. In the workplace, many businesses handle toxic materials and require devices to monitor carefully levels of toxic materials to avoid endangering employees. In the military, the command infrastructure requires knowledge of the environment in which soldiers are operating to provide sufficient rest periods and nutrition and hydration levels not only to avoid unduly fatiguing soldiers but also to realize as high as possible performance levels from military personnel. In the widening war on terror, it is important to monitor for trace elements from weapons manufacture, sometimes over a widely dispersed, remote geographical area. Such evidence permits preemptive military/police action to be undertaken to apprehend terrorists before a terror attack occurs. Additionally, terrorists are expected to use weapons of mass destruction, such as nuclear weapons, "dirty" bombs, and chemical/biological weapons, in the coming years. It is desirable to implement a system to gather and analyze data in real time so that timely and well-targeted emergency response can be provided. The impacted area(s) and/or likely area(s) to be impacted can be determined using baseline data from a geographically dispersed sensor system (or Situational Awareness Monitor System) and existing atmospheric/plume models.

There are at least four desirable attributes of a Situational Awareness Monitor System or SAMS for event prediction and consequence management. First, it is desirable to permanently mount data acquisition units at key locations to collect real-time information for use in atmospheric/plume models to establish atmospheric baseline dispersion patterns. Second, it is desirable to incorporate a sensor suite capable of detecting pre-event indicators (such as elevated radiation levels) with the goal of prevention of a release. Third, it is desirable to have rapidly deployable units to augment the existing network on a much finer grid in the case of an event or release. Finally, the total cost of the SAMS should be relatively low to provide federal, state, and local authorities with limited finances the ability to acquire the SAMS as part of an emergency response plan.

SUMMARY OF THE INVENTION

These and other needs are addressed by the various embodiments and configurations of the present invention. The present invention is directed to a sensor unit for collecting sensed information relating to the exterior environment and/or a base unit for communicating with a plurality of networked sensor units, particularly in a SAMS. The sensed information can be air temperature, radiant temperature, humidity, rainfall amount, direction, location, wind speed and direction, barometric pressure, and/or the presence and/or amount of chemical and/or biological warfare agents, nuclear radiation, one or more selected pollutants, trace elements from weapons and/or their manufacture, or other substances.

In a first embodiment of the invention, a sensor network is provided that includes:
  (a) a number of sensor units; and
  (b) a base unit in communication with the sensor units and configured to operate in a network discovery mode (in which network topology information is collected) and a data polling mode (in which sensed information is collected from selected sensor units). The base unit and sensor units are spatially dispersed in different locations. Each of the sensor units is at least partially deactivated or in sleep mode until (i) a signal is received by the sensor unit from the base unit and/or the arrival of a scheduled time (which is received from the base unit) to perform a specified activity. As used herein, "sleep" mode means a self-deactivation of a sensor or control unit until a predetermined time or receipt of a predetermined signal and/or a reduction in electrical activity or circuit function below a selected threshold (which typically is a cumulative current drawn from the available (e.g., on board) power source of no more than about 5% of that drawn during the "wake" mode). More typically, the cumulative current is no more than about 1 mA in any measured period. "Wake" mode, in contrast, means an operational state when the sensor or control unit is activated, such as upon self-activation of the sensor or control unit at a predetermined time or upon receipt of a predetermined signal. Because the sensor units are activated on an "as needed" basis, the operational life of the stored primary power supply of each sensor unit is substantially lengthened.

In a second embodiment of the invention, a sensor unit is provided that includes:
  (a) a number of sensors;
  (b) a controller for processing measurement information from the sensors; and
  (c) a memory for storing the processed measurement information.

The sensors include one or more of the following:
  (a) an anemometer for measuring wind speed;
  (b) a rain gauge for measuring rainfall;
  (c) a compass for determining orientation of the sensor unit relative to the earth's magnetic field;

(d) a Global Positioning System receiver for determining a location of the sensor unit;

(e) a barometric pressure sensor for measuring barometric pressure;

(f) an air temperature sensor for measuring ambient air temperature;

(g) a humidity sensor for measuring humidity;

(h) a level for determining an orientation of the sensor unit relative to the earth's gravitational field; and (i) a radiant temperature sensor for measuring radiant temperature.

The sensor unit can also include a wireless modem for communicating with other sensor units and the base unit.

In a third embodiment of the invention, a sensor unit is provided that includes:

(a) a first sensor module having a first connection interface;

(b) a second sensor module having a second connection interface; and (c) a control unit having a third connection interface.

Each of the first, second, and third connection interfaces is configured to connect interchangeably to any of the other connection interfaces.

The sensor modules and control unit are typically stacked vertically. For example, the second sensor module is positioned between the first sensor module and control unit. When stacked, the first, second, and third connection interfaces are positioned along a common axis. In the stacked configuration, the communication/power management interfaces between adjacent stacked units are typically the same to provide for interchangeability of the units and power and signal flows pass through intervening modules to other modules. The interface between adjacent stacked units may be wired or wireless.

In a fifth embodiment of the invention, an anemometer for measuring wind speed and direction is provided that includes:

(a) first and second transducers positioned along a first axis; and (b) third and fourth transducers positioned along a second axis that is orthogonal to the first and second axes. Each of the first, second, third, and fourth transducers are configured to transmit and receive a measurement signal.

The anemometer includes a controller operable (i) during a first time interval, to transmit a first measurement (e.g., ultrasonic) signal from the first transducer to the second transducer; (ii) during a subsequent second time interval, to transmit a second measurement signal from the second transducer to the first transducer; (iii) during a subsequent third time interval, to transmit a third measurement signal from the third transducer to the fourth transducer; and (iv) during a subsequent fourth time interval, to transmit a fourth measurement signal from the fourth transducer to the third transducer. To provide inexpensive and sensitive circuitry, the first, second, third, and fourth transducers are multiplexed together to use a common receive circuit, though the transducers have separate transmit circuits.

In a sixth embodiment of the invention, a rain gauge is provided that includes:

(a) an inlet for receiving precipitation;

(b) an outlet for discharging collected precipitation;

(c) a first conduit in communication with the inlet; and (d) a second conduit in communication with the outlet. Adjacent ends of the first and second conduits are spaced from one another. To provide accurate and repeatable droplet counts, the adjacent ends of the first and second conduits are angled relative to a selected horizontal plane and/or the second conduit comprises a longitudinal slot extending downwardly from the end of the second conduit.

The various embodiments can have advantages relative to existing systems. First, the sensor units can be mounted permanently at key locations to collect real-time information for use in atmospheric/plume models to establish atmospheric baseline dispersion patterns. Second, the sensor units can incorporate a sensor suite capable of detecting pre-event indicators (such as elevated radiation levels) with the goal of prevention of a release. Third, the sensor units can be rapidly deployable, either manually or remotely, to augment an existing SAMS network on a much finer grid in the case of an event or release. Fourth, the total cost of a SAMS using the sensor units can be relatively low, thereby enabling federal, state, and local authorities and other entities with limited budgets to implement a SAMS as part of an emergency response plan. The sensor networks can be extremely versatile and expandable with the end-user being able to mix and match sensors at each installation. This versatility permits a range of scenarios to be accommodated. Redundant communication options along with a self-configuring and self-healing network are important because a terrorist attack may well include attempts to disrupt communications and power in the target location.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 17 is a data structure according to an embodiment of the present invention;

DETAILED DESCRIPTION

Overview of the Networked Sensor Units

Figure 1:
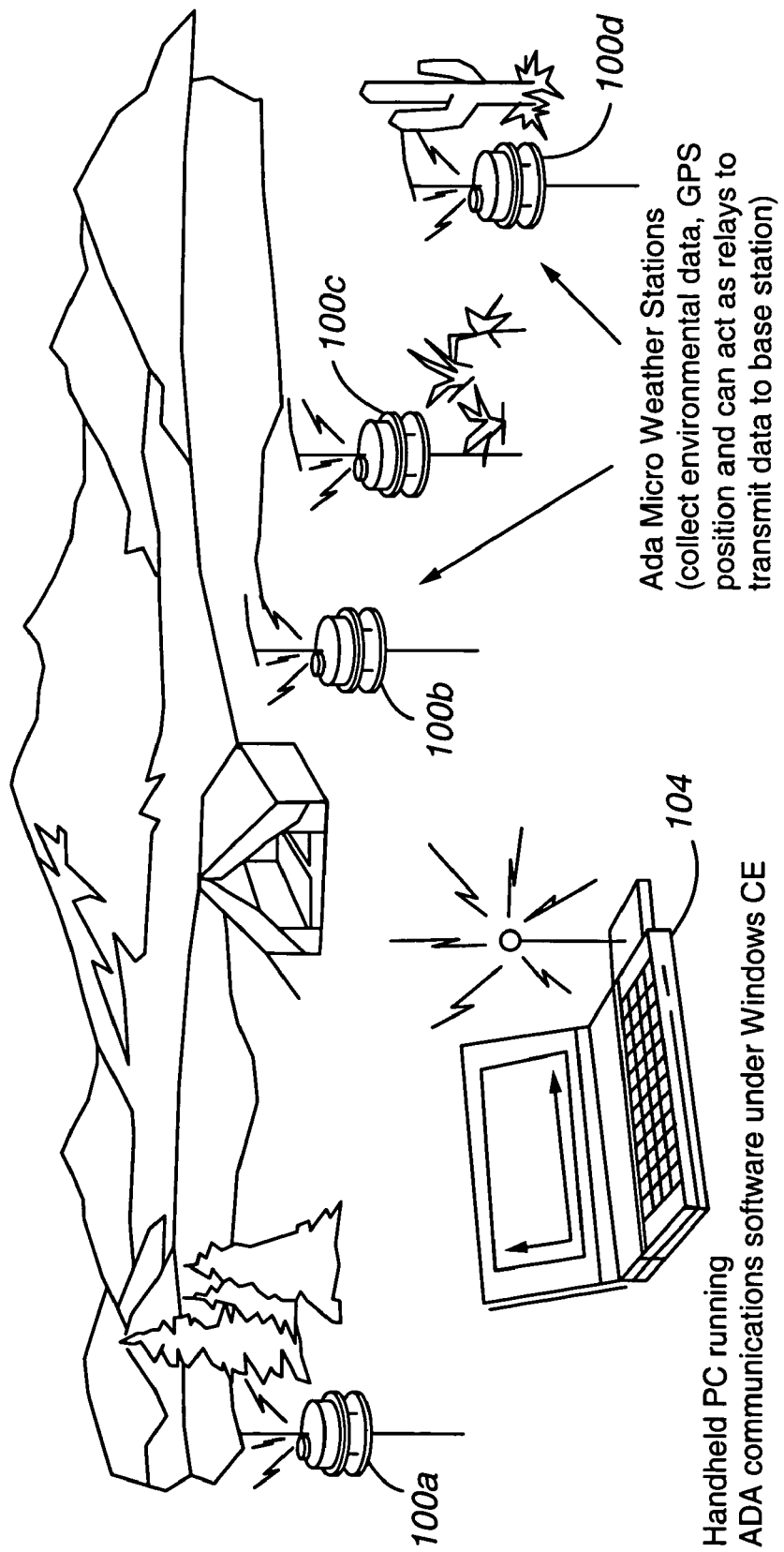
FIG. 1 depicts a wireless network of weather stations according to an embodiment of the present invention.

Referring to FIG. 1, the wireless networking of a plurality of sensor units is depicted. Each of the sensor units or nodes 100a–d and the base unit 104 are geographically dislocated, or dispersed over a wide area, but in wireless communication with one or more adjacent, neighboring nodes/sensor units. The various sensor units communicate with one another to exchange network topology information, control signals, and weather (e.g., humidity, rainfall levels, wind velocity and direction, radiant temperature, barometric pressure, and air temperature, and other measurement information.

The units may be deployed by numerous techniques. For example, they can be employed manually or automatically, such as by airborne delivery systems.

The sensor units can wirelessly communicate using analog or digital signals over any suitable carrier frequency range, such as the RF, microwave, and millimeter frequency spectra. A particularly preferred carrier frequency range is the radio frequency spectrum. In military applications, the sensor units can use suitable encryption techniques, such as defined by the Wired Equivalent Privacy or Wireless Transport Layer Security protocols, and/or frequency and/or time hopping and/or spread spectrum techniques to provide secure communications among the nodes. In a preferred configuration, a MaxStream or Aerocomm spread-spectrum frequency-hopping 9600 baud wireless communication modality is employed.

The communications can be defined by one or more suitable suitable protocol(s). The protocols can be nonproprietary, such as 802.11, Bluetooth, and HiperLAN, or proprietary.

The Sensor Unit

Figure 3:
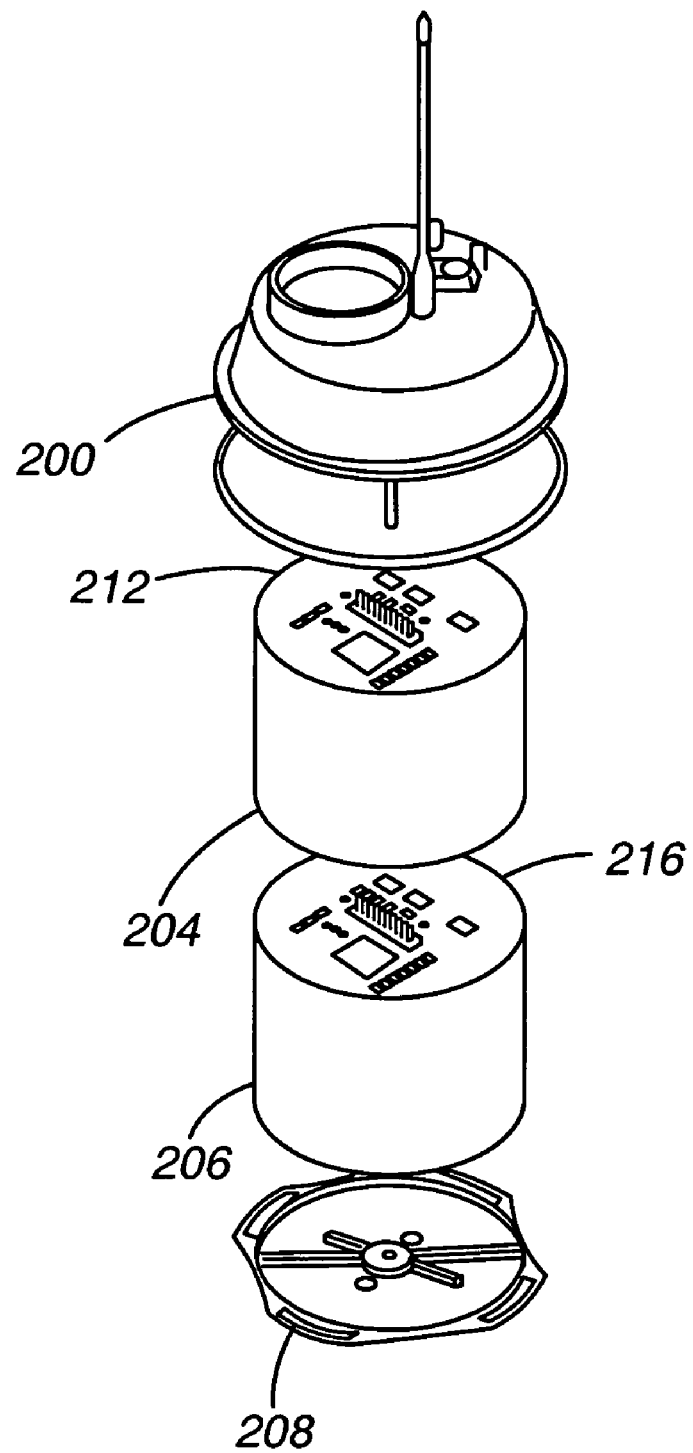
FIG. 3 depicts a weather station according to an embodiment of the present invention.
Figure 4:
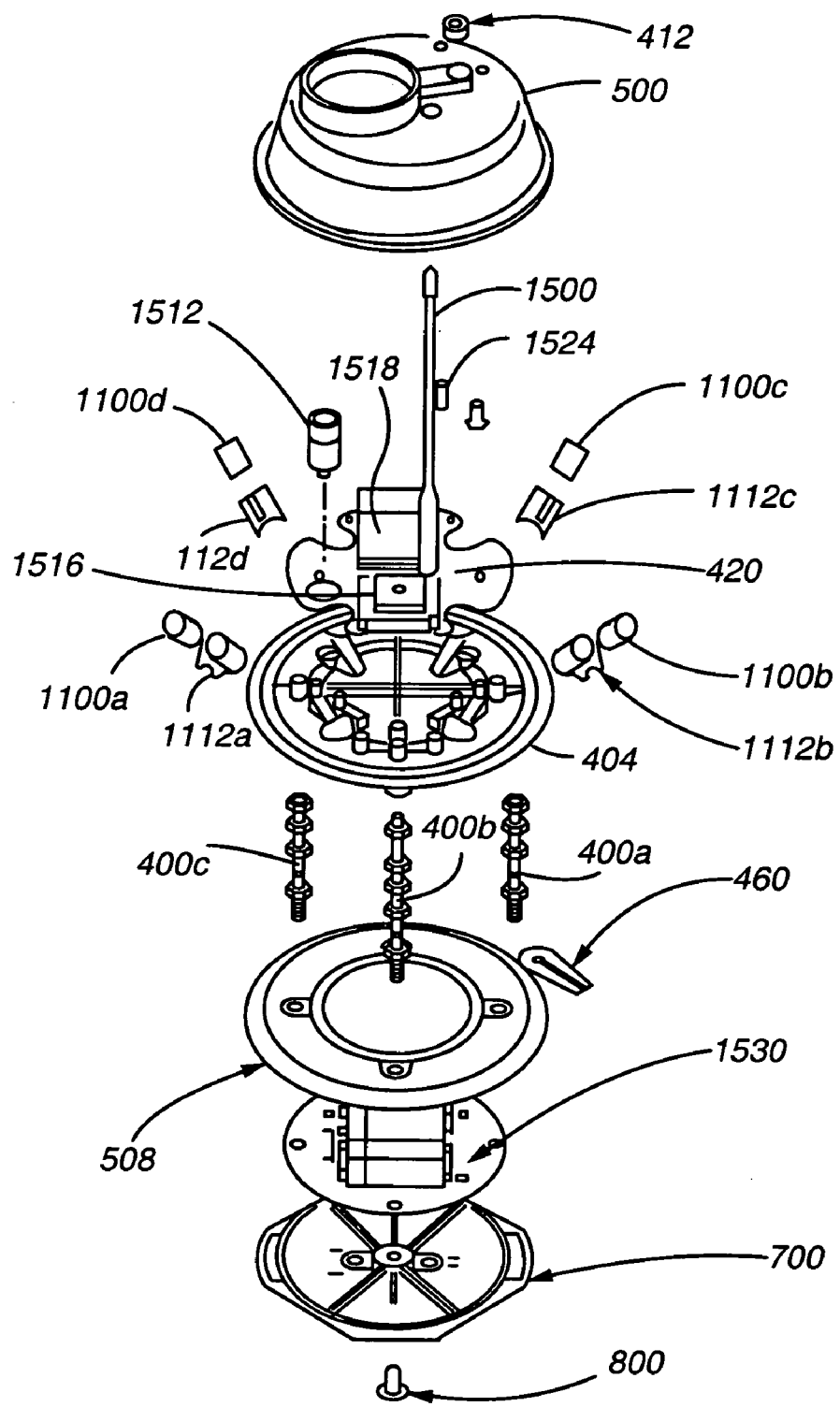
FIG. 4 is an exploded view of the weather station of FIG. 3.
Figure 5:
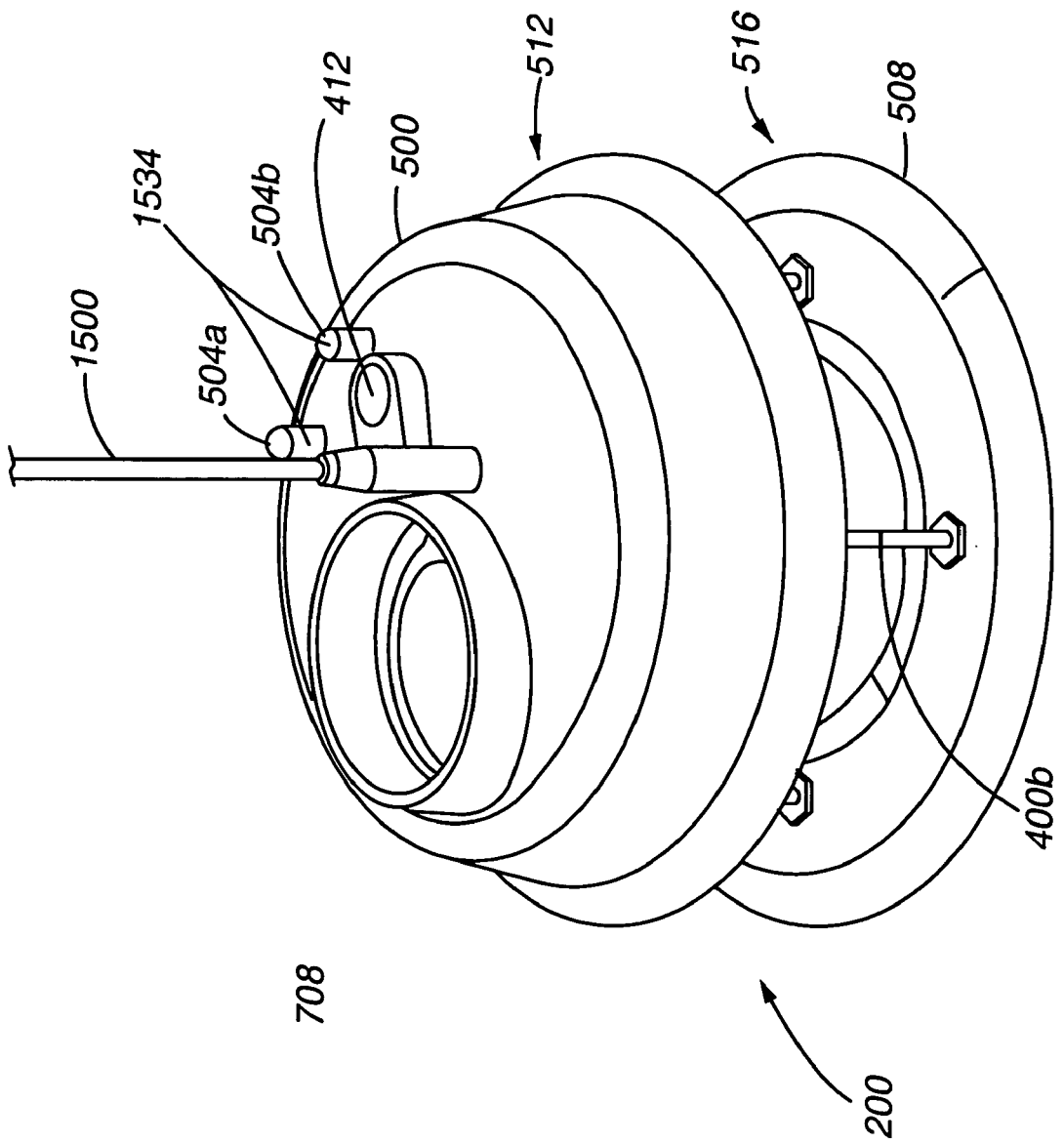
FIG. 5 is a perspective view of a control unit engaged directly with a removable base according to an embodiment of the present invention.
Figure 6:
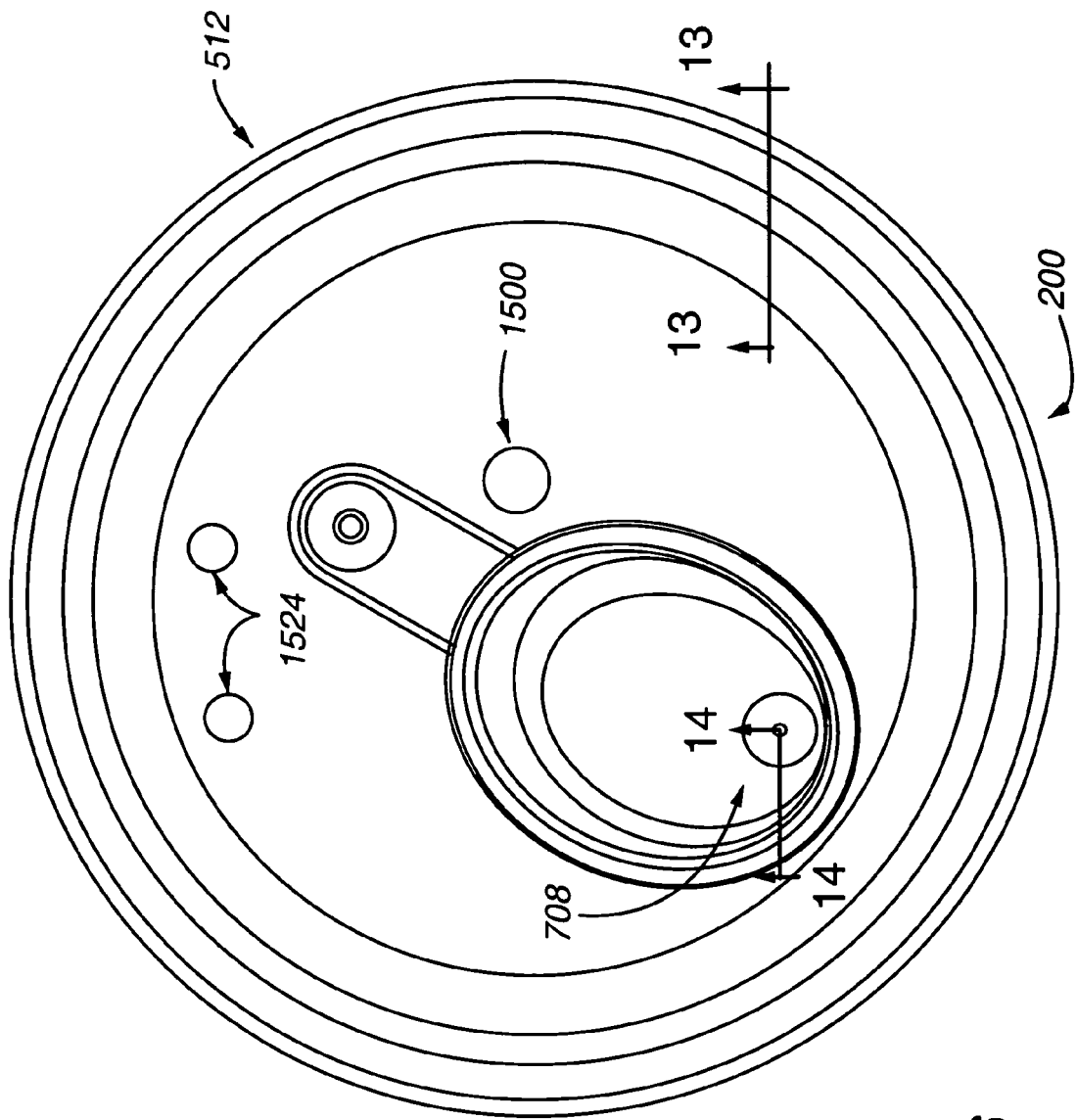
FIG. 6 is a top view of the control unit of FIG. 5.
Figure 7:
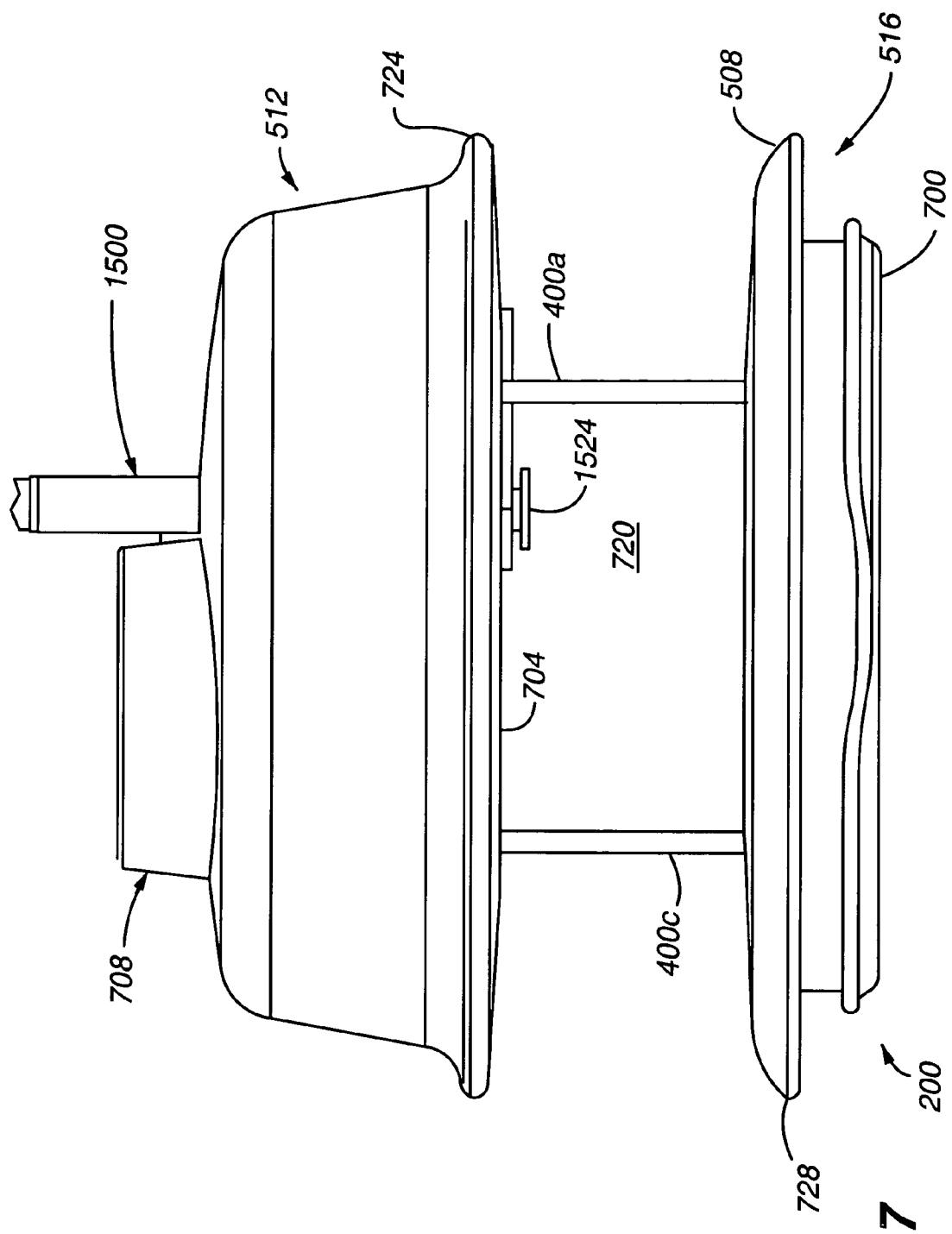
FIG. 7 is a side view of the control unit of FIG. 5.
Figure 8:
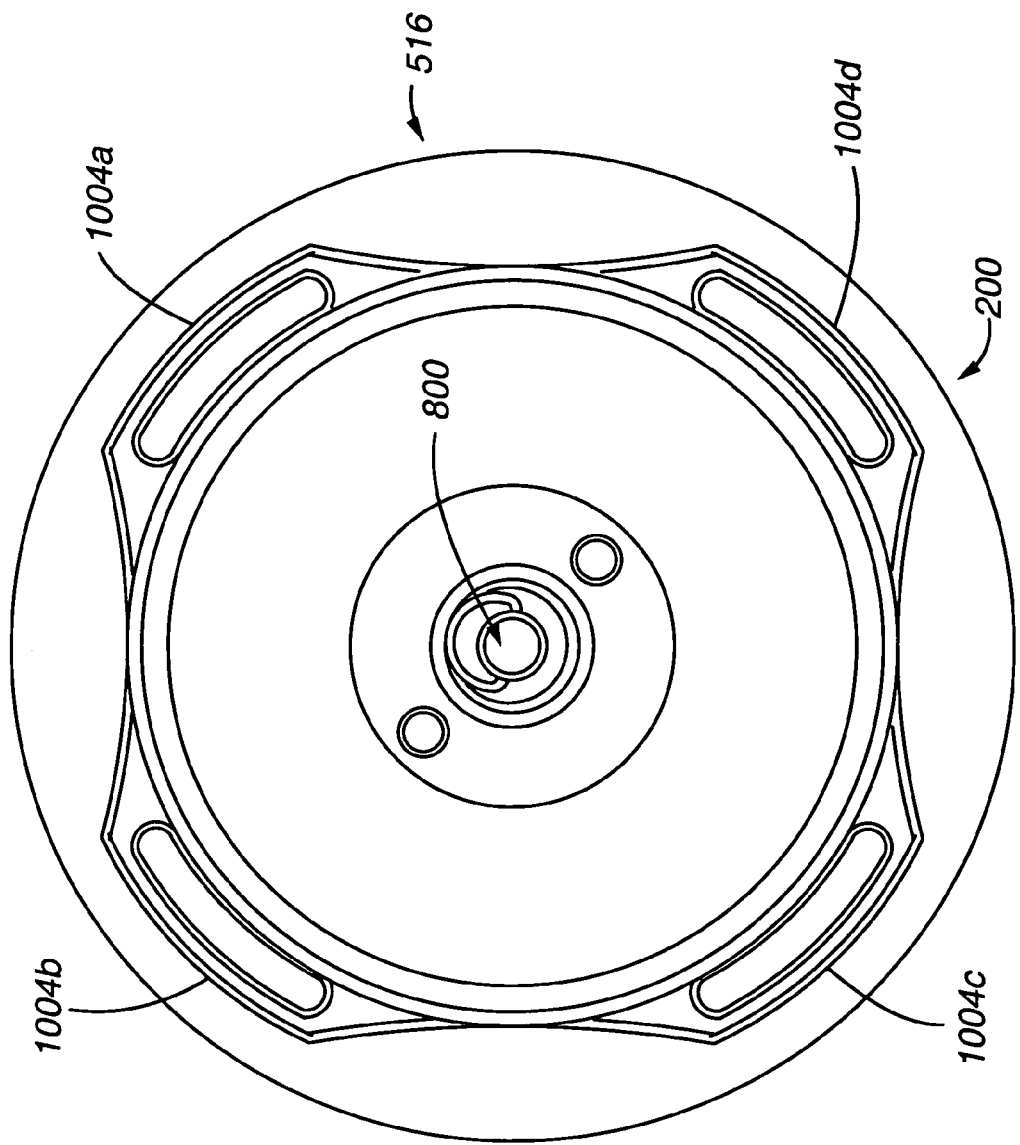
FIG. 8 is a bottom view of the control unit of FIG. 5.

With reference to FIGS. 3–4, each of the sensor units includes a control unit 200, one or more removable stacked, removably engaged intermediate measurement modules 204 and 206, and a removable base unit 208.

The expansion module interfaces 212 and 216 between the adjacent components are universally configured such that the positions of modules 204 and 206 could be reversed. This interchangeability is effected using universally configured male/female connector arrangements. In other words, the connector arrangements on the upper ends of the modules 204 and 206 are identically configured as shown, and the connector arrangements (not shown) on the lower ends of the modules 204 and 206 and of the control unit 200 are identically configured to engage the connectors on the upper ends of the modules 204 and 206. This ready interchangeability of the modules 204 and 206 avoids operational problems caused by improper stacking of the various sensor unit elements.

In one embodiment, the interchangeability of the various modules results from the use of a generic printed circuit board with modified firmware for the corresponding module. A custom electronics interface between the adjacent units can also be provided. Communication and power transmission paths pass through the intermediate units, such that the control unit 200 can communicate with any of the desired modules 204 or 206; thus, the control unit 200 can communicate with the module 206 by way of a communication path provided by the intermediate module 204. The control unit 200 and intermediate modules 204 or 206 can receive power from a lower module via a power transmission path provided by the intermediate modules; thus, the control unit 200 can receive power from any of module 204, module 206, and/or base unit 208.

The components of the control unit 200 will now be described with reference to FIGS. 5–15. As can be seen from FIGS. 5 and 15, each control unit includes an antenna 1500, an ultrasonic anemometer 1504 (discussed in detail below) for measuring wind speed and direction, an external power source 1508 (which can be any suitable power source typically located in an intermediate module), a rain gauge 1512 (discussed in detail below), a compass 1514 providing X and Y directional components, a Global Positioning System or GPS receiver 1516 (which is preferably an Axiom Navigation Swift A1™ with SiRFStar-II architecture or a Trimble Lassen SQ architecture) for receiving GPS location information for the node, a radio modem 1518 for receiving from and transmitting to other nodes network control information, measurement data, and other information, a barometer pressure sensor 1520 (which is preferably an MPX5100™ by Motorola), a humidity sensor 1522 (which is preferably an HIH-3602™ by Honeywell, an air temperature sensor 1524 (which preferably is a semiconductor digital temperature sensor by Dallas or an RTD Platinum temperature sensor), a two-axis level or tilt sensor 1526 (which is preferably an analog device using a dual axis 2G accelerometer) providing X and Y control unit attitude components, power regulator 1528 (which preferably provides 3.3V regulated), internal power source 1530 (which can be any suitable power source and is typically 4 or more AA Lithium batteries), power bus controller 1532 to effect power supply only to active subsystem components, such as to each of the GPS receiver 1516, anemometer 1504, pressure sensor 1520, humidity sensor 1524 (protected by shield 460), radio modem 1518, compass 1526 (which is preferably an HMC1022™ by Honeywell), visual level 412, and air temperature sensor 1524, to minimize power consumption, irradiance sensor 1534, memory 1536 (which can be any suitable medium with an Electrically Erasable Read-Only Programmable Memory or EEPROM being preferred) for storing configuration information and other data, and a micro-controller 1540.

The serial ports 1542a and 1542b receive user configuration and calibration information received from a user during manufacturing testing and calibration and for specialized user configurations and firmware upgrades. The information is received via a graphical user interface and/or the radio modem 1518. A multiplexer 1544 automatically detects the presence of an external serial port connection through the expansion interface.

The module 204 or 206 communicates with the control unit 200 via the inter-system communication interface 1546 and expansion module interface 1548. The expansion module interface 1548 can include a power control/management function, depending on the power source used for the module.

The microcontroller 1540 includes a central processing unit 1550, a program memory 1552, a digital event capture function 1554, an analog-to-digital converter 1556, a timer/clock 1558 (which is synchronized using GPS timing information received by the GPS receiver 1516), the first and second serial ports 1542a and 1542b, an inter-system communication interface 1546, and a digital input/output 1560. The processing unit 1550 can be any suitable processor, with a microprocessor being preferred. Program memory 1552 is typically a combination of Random-Access Memory and Read-Only Memory and can be of any suitable form. The digital event capture function 1554 interrogates the tilt sensor 1526 and rain gauge 1512, either at predetermined intervals or upon command of the microcontroller, for digital measurement information. The analog-to-digital converter 1556 receives analog measurement information from the humidity sensor 1552, barometric pressure sensor 1520, and compass 1514 and converts the information into digital form. The timer/clock 1558 provides timing information, such as the time of day, the day, the month, and/or the year, and time duration information for the central processing unit 1550. The intersystem communication interface 1546 receives commands/queries from the central processing unit 1550 and provides the commands/queries to and, in response, receives data from one or more of the air temperature sensor 1524, the radiant temperature sensor 1534, anemometer 1504, memory 1536, and expansion module interface 1548. The digital input/output 1560 provides digital command/query signals from the central processing unit 1550 to the compass 1514 or power bus control 1532. The microcontroller 1540 is preferably a MSP430F149™ by Texas Instruments, which has 60K ROM and 2K RAM. These components are mounted on circuit board 420.

As will be appreciated, the intermediate modules 204, 206 can provide a number of ancillary features to the control unit 200. For example, the modules can make additional measurements/detections, such as the presence of chemical and/or biological warfare agents, nuclear radiation, one or more selected pollutants, trace elements from weapons and/or their manufacture, or other substances and/or can provide additional primary or secondary power sources for the control unit. For intermediate measurement modules that measure desired parameters, calibration factors, a measured parameter type identifier, and a unique identifier (such as a serial number) are stored in the module and provided to the control unit such that the control unit knows how to process the received measurement signals and can index the measurements with the specific module performing the measurements.

The base unit 104 (FIG. 1) can have none, some, or all of the features of the sensor units. Typically, the base unit 104 has a more powerful central processing unit, greater capacity program memory and longterm memory, and greater stored power capacity than the sensor units. As will be appreciated, the base unit 104 typically performs a significantly greater amount of processing than the individual nodes and must have sufficient power to survive the longest operational node. In one configuration, the base unit 104 is the same as the sensor unit 100 except that the base unit 104 is connected to a personal computer or laptop.

The Temperature Sensors

The radiant temperature sensor 1534 is located on the upper surface 500 of the control unit 200. To provide differing degrees of direct solar radiation absorption, the sensor 1534 includes dual radiation probes 504a,b. One of the probes is typically painted black and the other white.

The air temperature sensor 1524 is located on the lower surface 704 of the control unit 200 to avoid direct exposure to solar radiation. When the control unit is properly deployed, this surface will not receive direct sunlight. To avoid direct exposure to solar radiation and the consequent erroneous measurements, the humidity sensor 1522 is also located on the lower surface 704.

The air temperature inside the control unit can be measured using a temperature sensor positioned inside the upper member of the control unit. The internal temperature can be used to correct thermal conductive errors from the weather station to the air temperature sensor.

The Rain Gauge

The rain gauge 1512 will now be discussed with reference to FIGS. 6, 12, 14A, 14B, 20, and 21. The gauge includes upper and lower angled drip tubes 1400 and 1404, the tips or ends 2100 and 2104, respectively, of which are separated by a slot or space 2108. To provide repeatable measurements, uniform droplet size, and reduced hysteresis and water tension at the outlet 2100 of the upper tube 1400, the ends of the tubes are spatially offset and angled, typically at approximately the same angle and the lower drip tube is slotted vertically. As will be appreciated, the angled ends provide reduced surface tension and thereby assist drainage of the water collected in the upper tube, and the vertical slot on the side of the lower tube, through a split capillary tube action, prevents the droplets from reaching too large a size and therefore provides for a narrow range of droplet sizes. The angle α of the ends 2100 and 2104 (relative to a horizontal plane) typically ranges from about 30 to about 60 degrees. The distance "D" between the end of the tubes typically ranges from about 0.01 to about 0.2 inches.

The upper drip tube 1400 typically has a smaller radius/diameter than the lower drip tube 1404 to permit the drop to pass completely through the lower drip tube 1404. The radius of the upper tube 1400 ranges from about 50 to about 70% of the radius of the lower drip tube 1404.

An electrical parameter, such as current, is measured to provide a count of the number of rain droplets passing from the upper to the lower drip tube. When a drop is in simultaneous contact with the upper and lower tubes, the electrical circuit defined by the upper and lower tubes (which are conductive) is completed (or the switch is closed) and a signal is received by the digital event capture function 1554. Each signal received correlates with one water droplet.

The rain collection reservoir 708 collects the rain and is in liquid communication with the upper drip tube to provide gradual drainage of the rain from the reservoir. The exterior housing 1450 around the tubes prevents entry of the droplets into the interior of the control unit and effects drainage of the rain from the rain gauge and through the rain gauge outlet 1454.

A splash guard or a screen or mesh material (not shown) may be placed over the input to the rain collection reservoir 708 to prevent splashing and loss of rain. Such a loss of rain can cause the precipitation measured to be too low.

The Power Source and Removable Base

Figure 9:
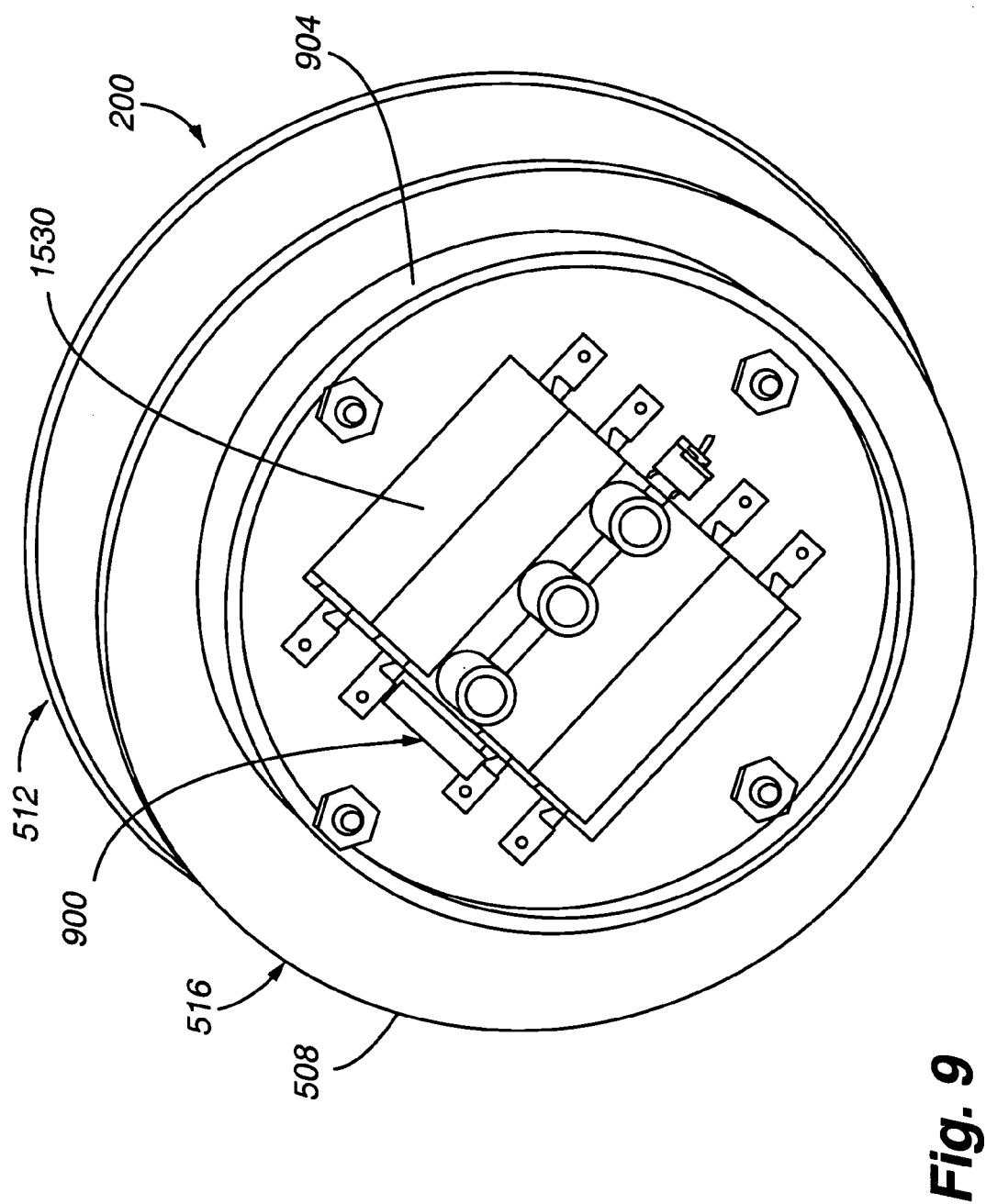
FIG. 9 is a bottom view of the control unit of FIG. 5 with the removable base removed.
Figure 10:
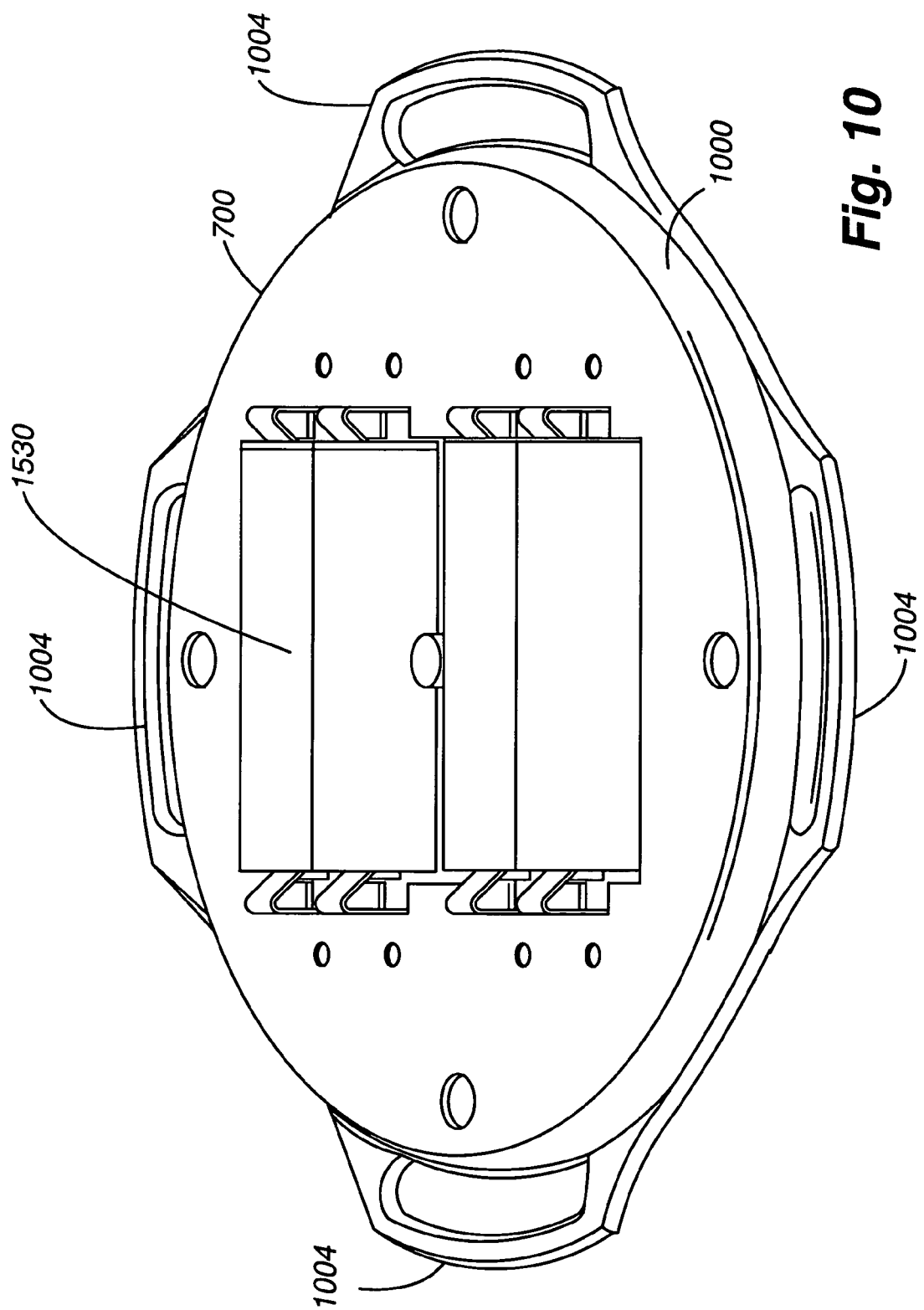
FIG. 10 is a top view of the removable base removed from the control unit of FIG. 5.
Figure 16:
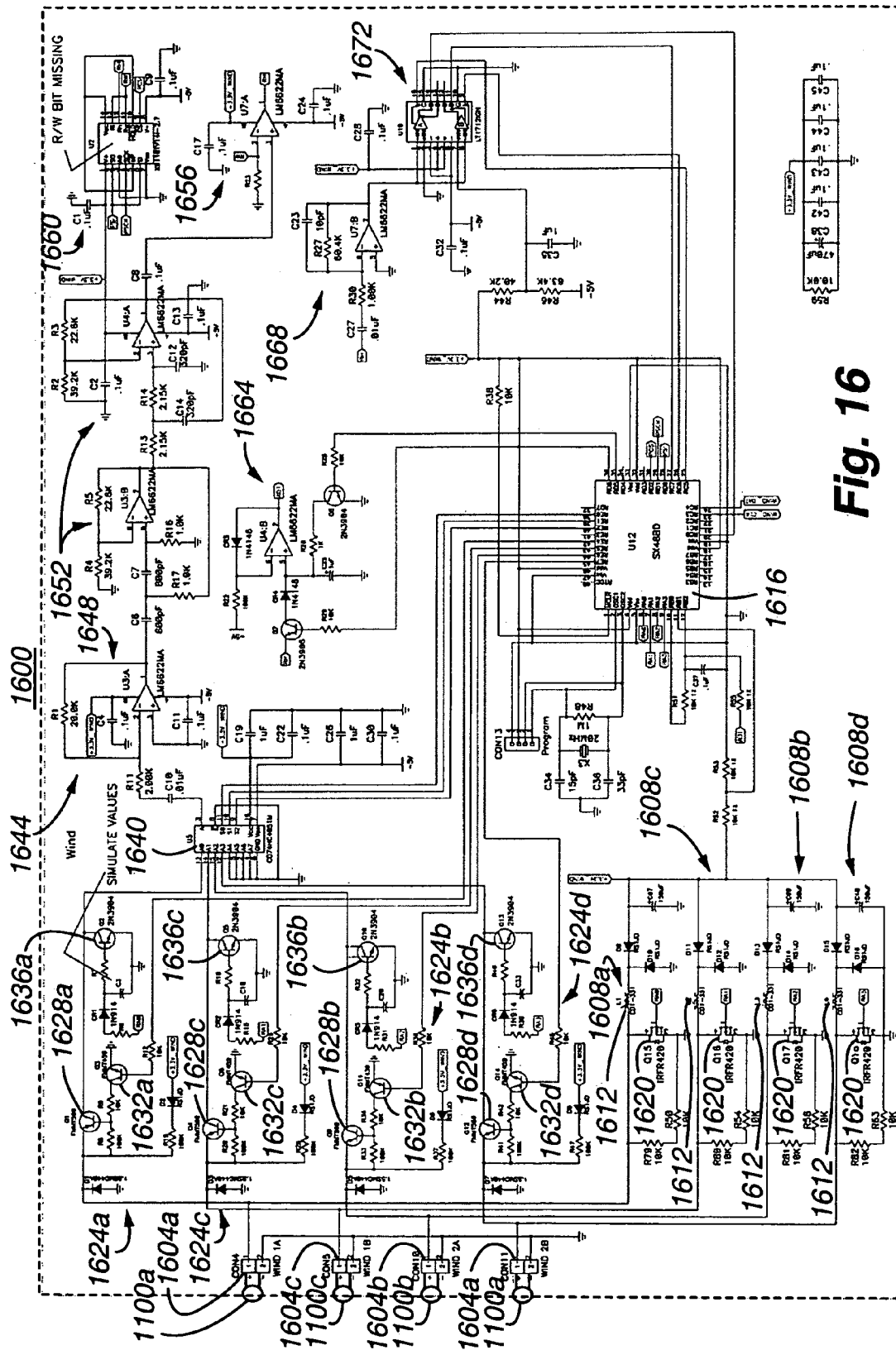
FIG. 16 is a circuit diagram for the anemometer assembly according to an embodiment of the present invention.

Referring now to FIGS. 4, 9 and 16, the power source and removable base will now be discussed. The base 700 is removably attached to the bottom 508 of the control unit using a recessed thumbscrew 800. The lower member 516 defined by the bottom 508 and removable base 700 includes the internal power source 1530, which is typically 4 or more AA Lithium batteries, as well as a communications port 900. As will be appreciated, the batteries are located in the lower member of the control unit to minimize electromagnetic interference with the operation of the electronic components located in the upper member and to provide magnetic stability. An angled peripheral tip 904 engages the lip 1000 of the removable base 700 to provide a seal from terrestrial fluids. As shown in FIG. 10, the removable base 700 is engaged with the bottom 508 (when there are not intermediate modules) or with the bottom of the adjacent intermediate module via a thumbscrew fastener mounting hole. Mounting handles 1004 on the base 700 can be used to anchor the control unit to a fixed surface, such as a tree, by means of a rope that is spooled between the base 700 and bottom 508.

The Anemometer and Surrounding Housing

Referring to FIGS. 4, 7, 11–12, 16 and 19, the anemometer and surrounding housing will now be described. The upper member 512 of the control unit 200 is spaced from the lower member 516 by means of four equally spaced or equidistant standoff tubes 400*a*–*d*. The standoff tubes are preferably arcuate in cross-section, with circular being more preferred, and are hollow to carry conductors for signal and power transmission to and from the lower member 516. The standoff tubes 400*a*–*d* have relatively small profiles to avoid creating a significant degree of wind turbulence in the area 720 between the upper and lower members 512 and 516. Typically, any wind disturbance lasts only for about 10 diameters of the standoff tube. The tubes preferably have a diameter of no more than about ⅛ inches.

Figure 11:
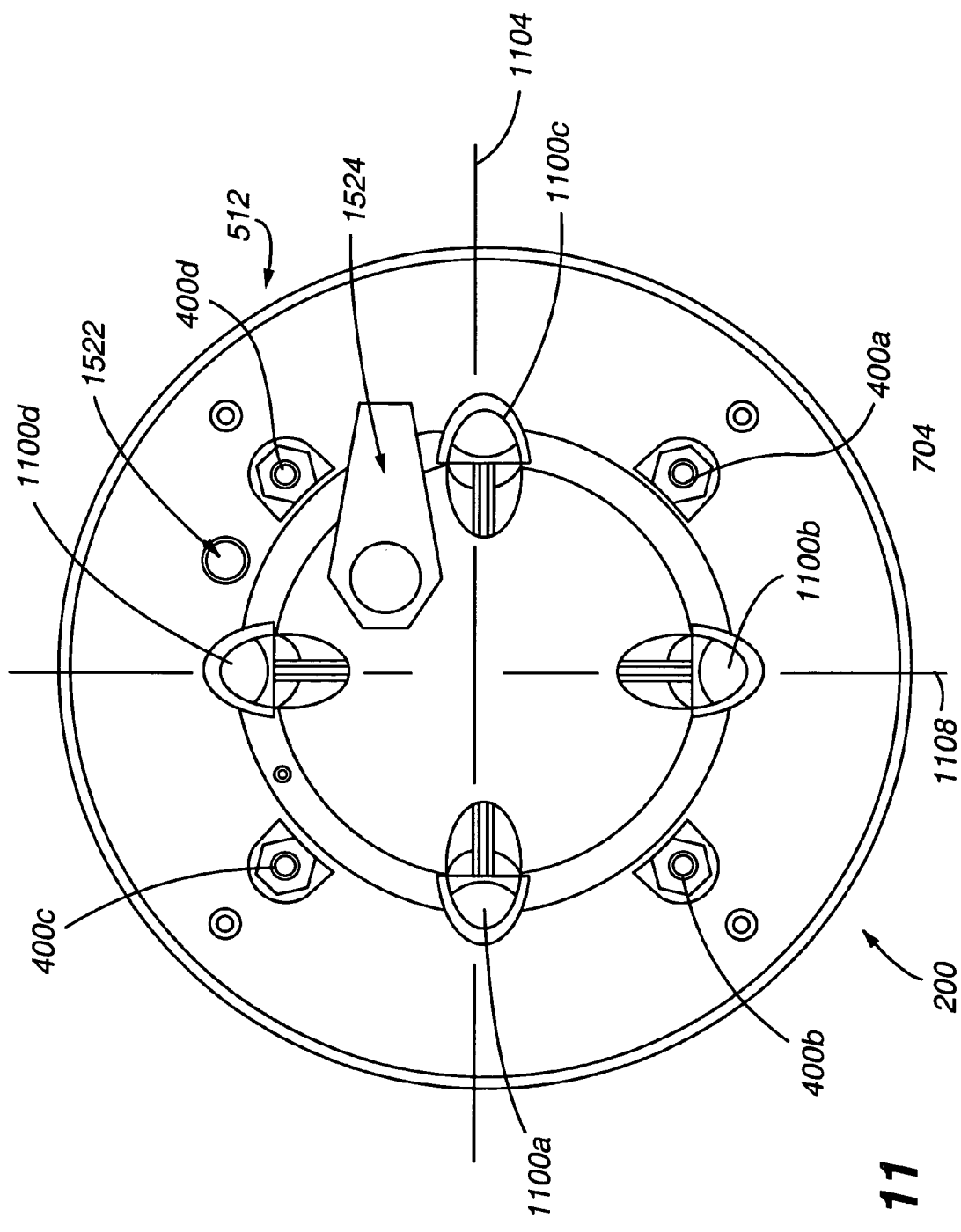
FIG. 11 is a view of the control unit along line 11—11 of FIG. 7.
Figure 12:
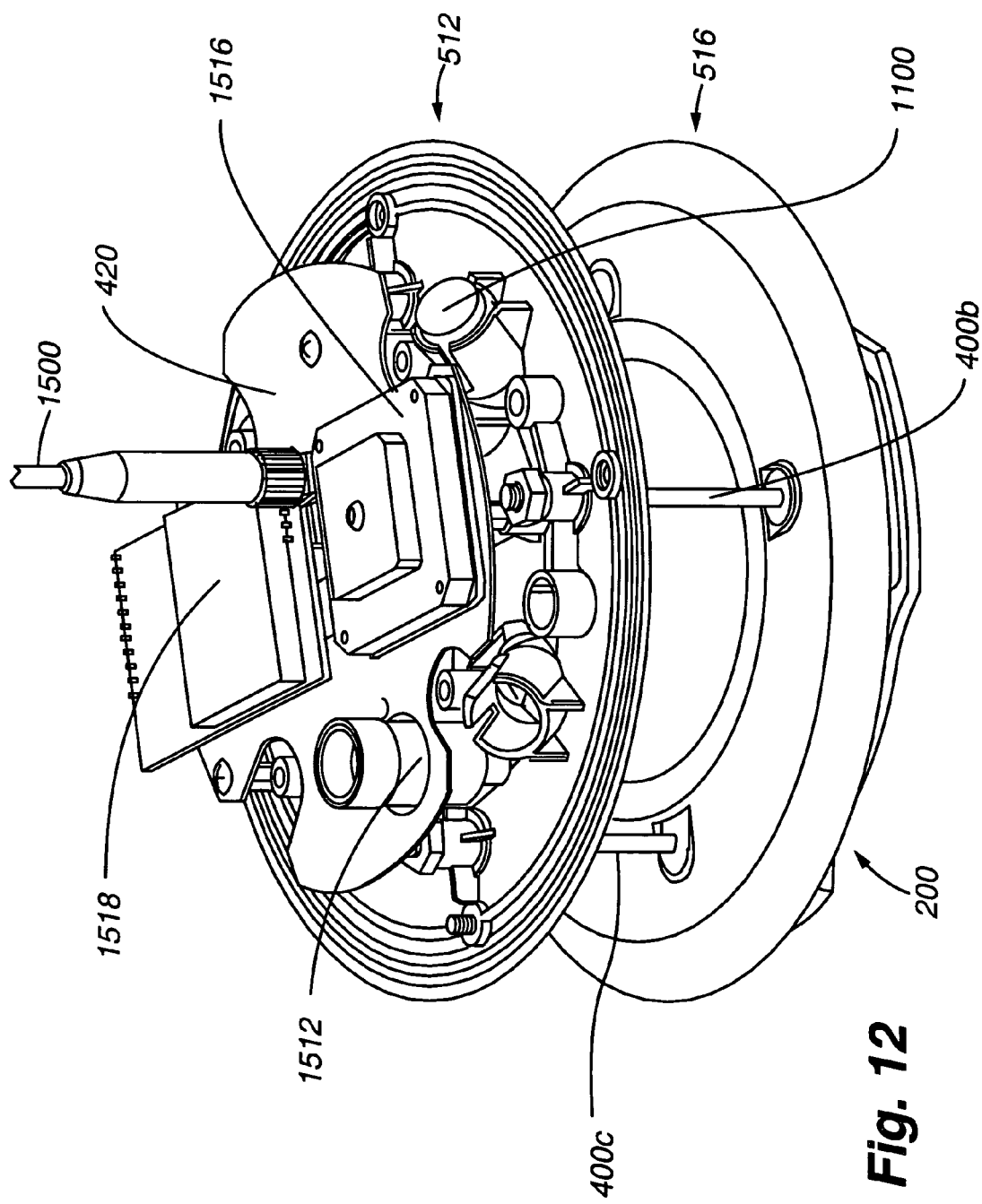
FIG. 12 is perspective view of the control unit with the upper control unit housing removed.

Referring to FIG. 11, the bottom 704 of the upper member 512 is depicted. The positions of the tubes 400*a*–*d* are shown. Additionally, two pairs of piezoelectric transducers, namely transducers 1100*a* and *c* and transducers 1100*b* and *d*, are depicted. The transducers act as both receivers and transmitters in the anemometer to measure both wind speed and direction. As can be seen from the figure, the pairs of transducers are laid out on orthogonal axes 1104 and 1108. As can be seen from FIG. 4, each transducer 1100*a*–*d* is held in a holder 1112*a*–*d* to accurately set the transducer orientation and position.

Figure 19:
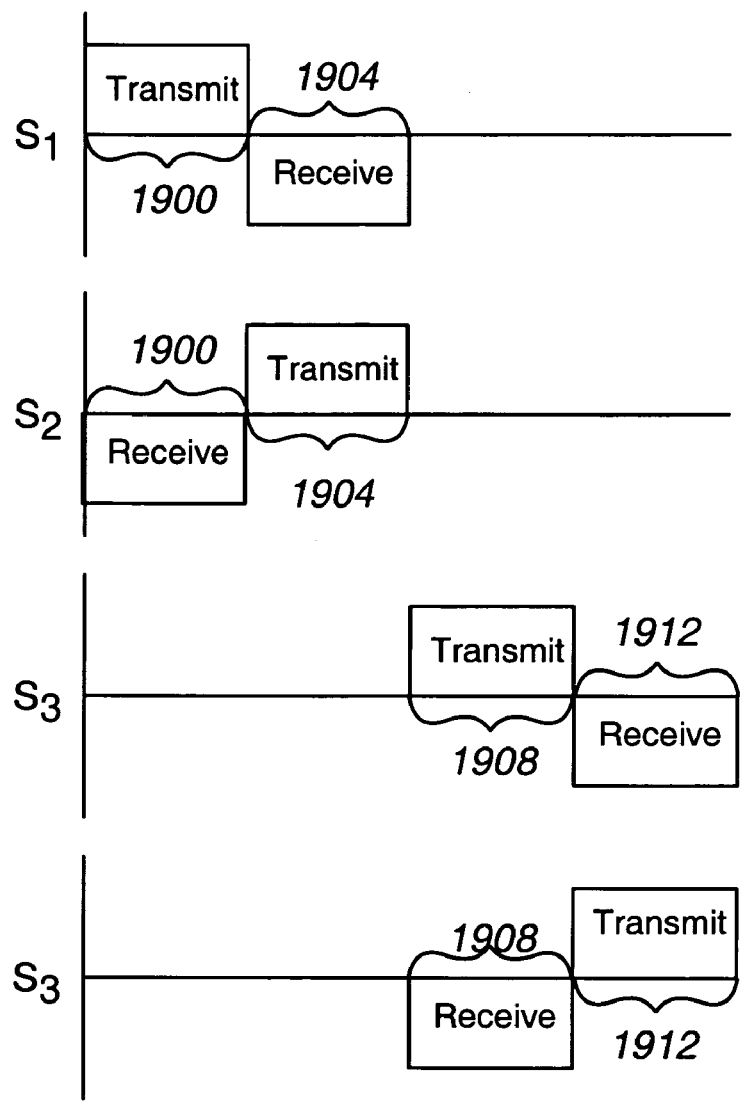
FIG. 19 depicts the operation of the various sensors of the anemometer according to an embodiment of the present invention.
Figure 20:
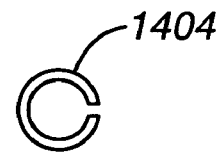
FIG. 20 is a cross-sectional view of the second conduit of the rain gauge assembly.
Figure 21:
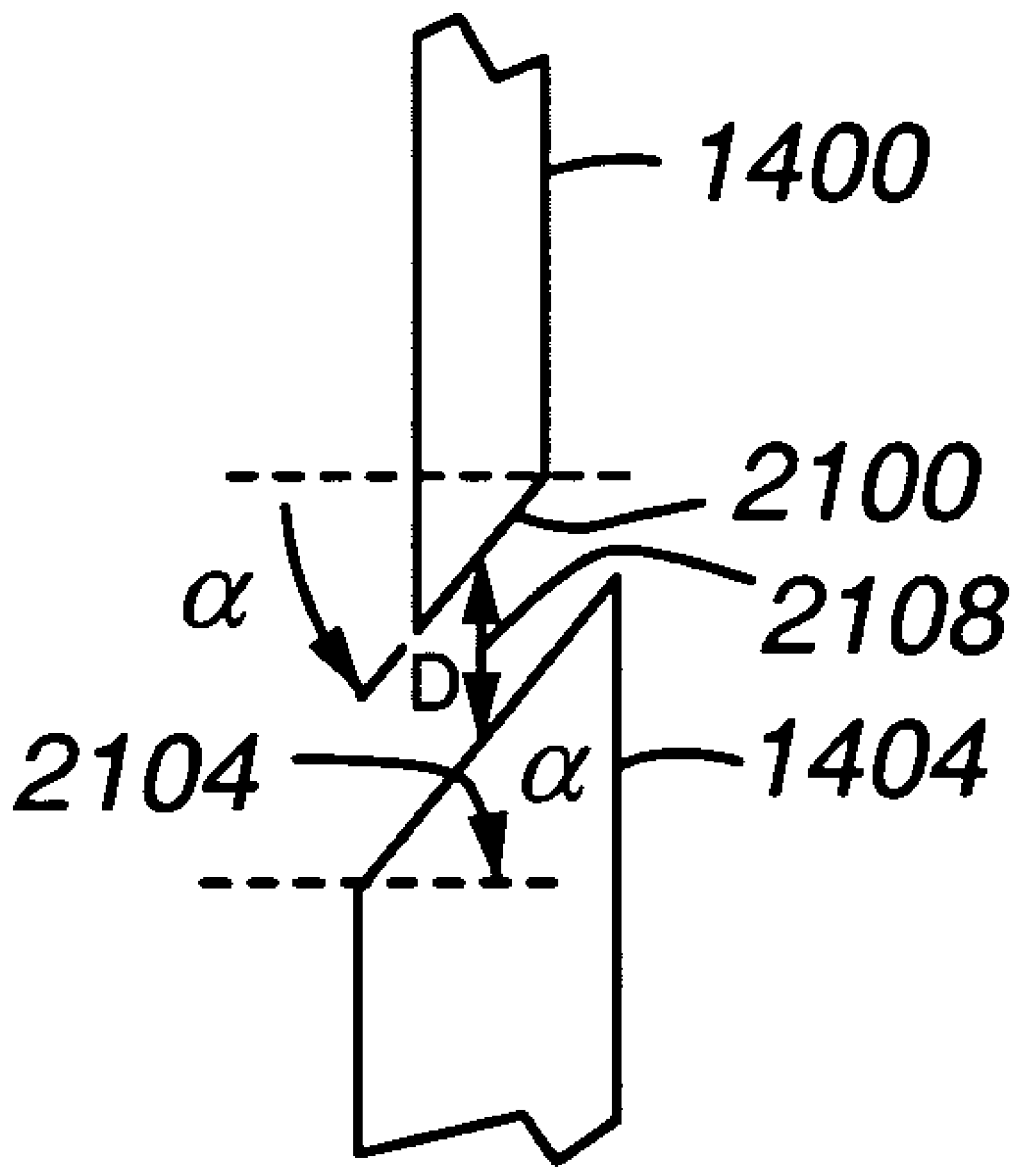
FIG. 21 is a side view of the upper and lower conduits of the rain gauge assembly.
Figure 22A:
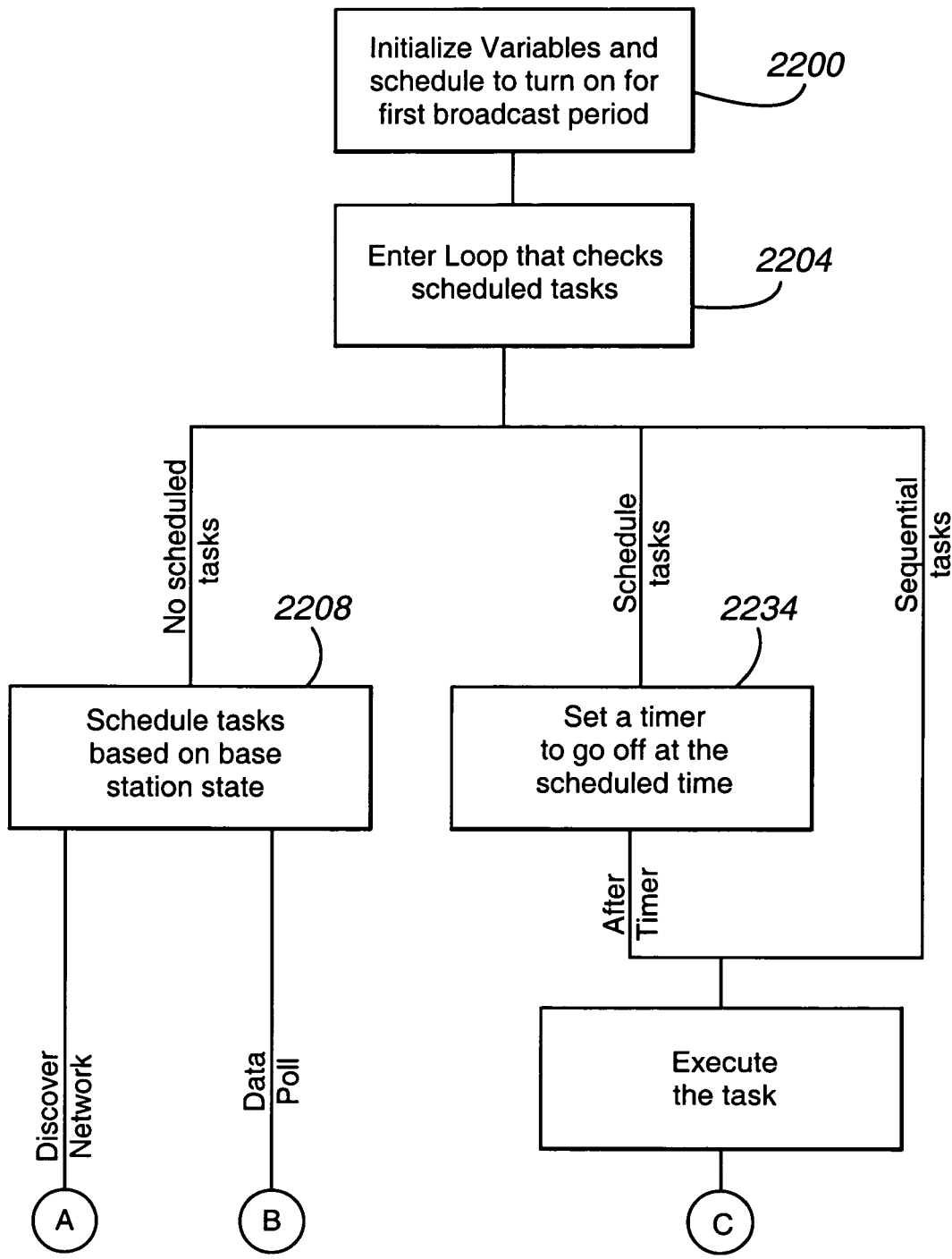
FIGS. 22A–D are flowcharts depicting operation of the networking software on the base unit.
Figure 22B:
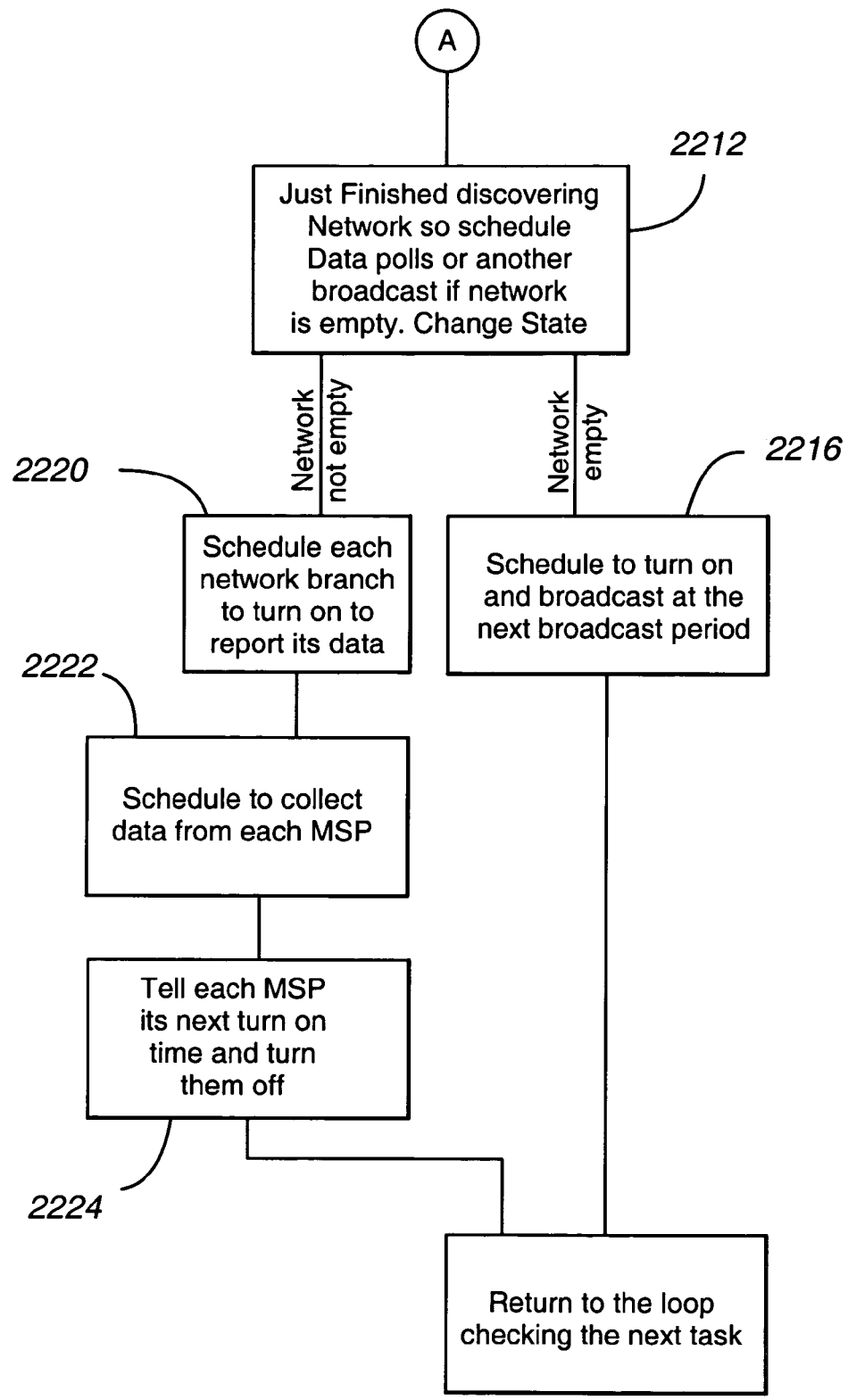
Figure 22C:
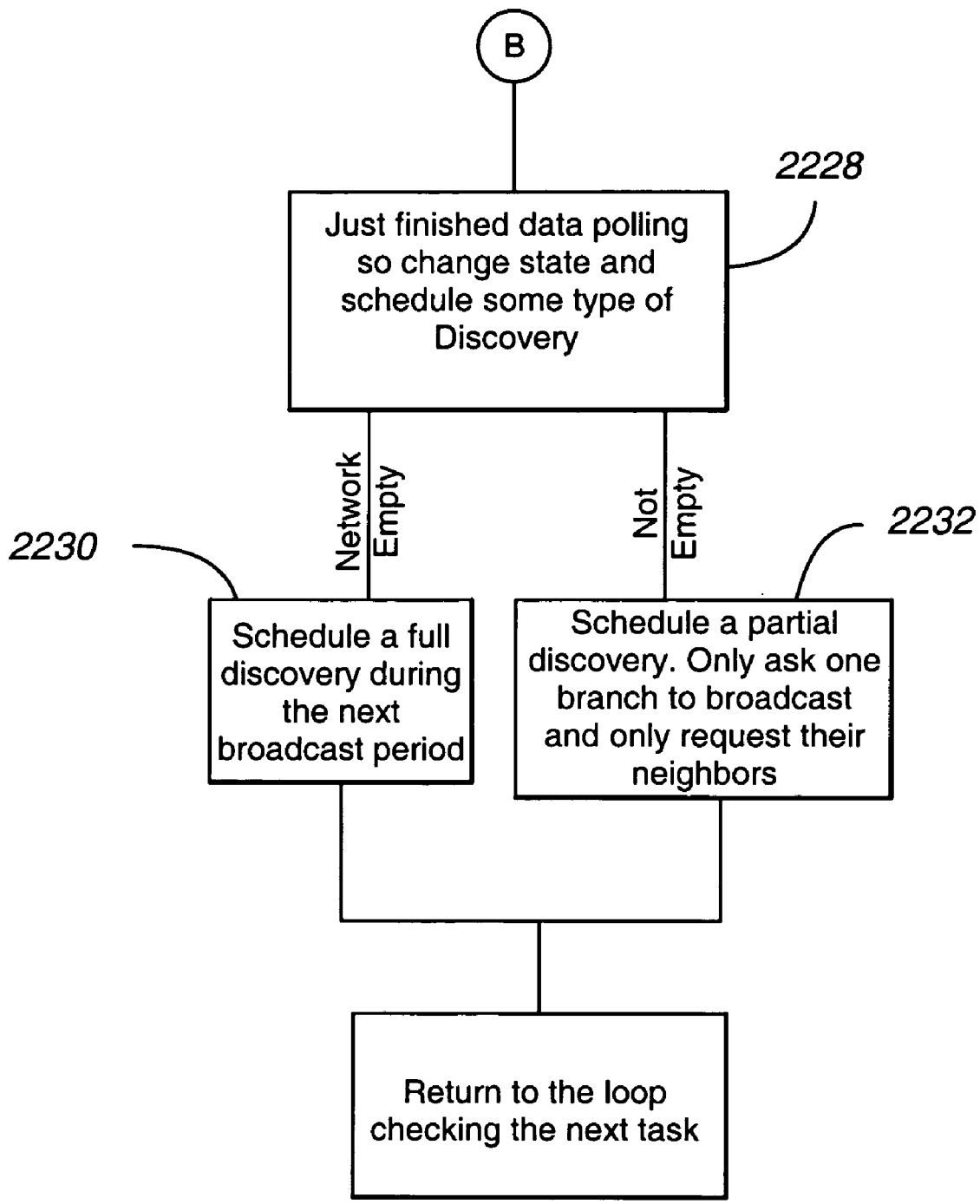
Figure 22D:
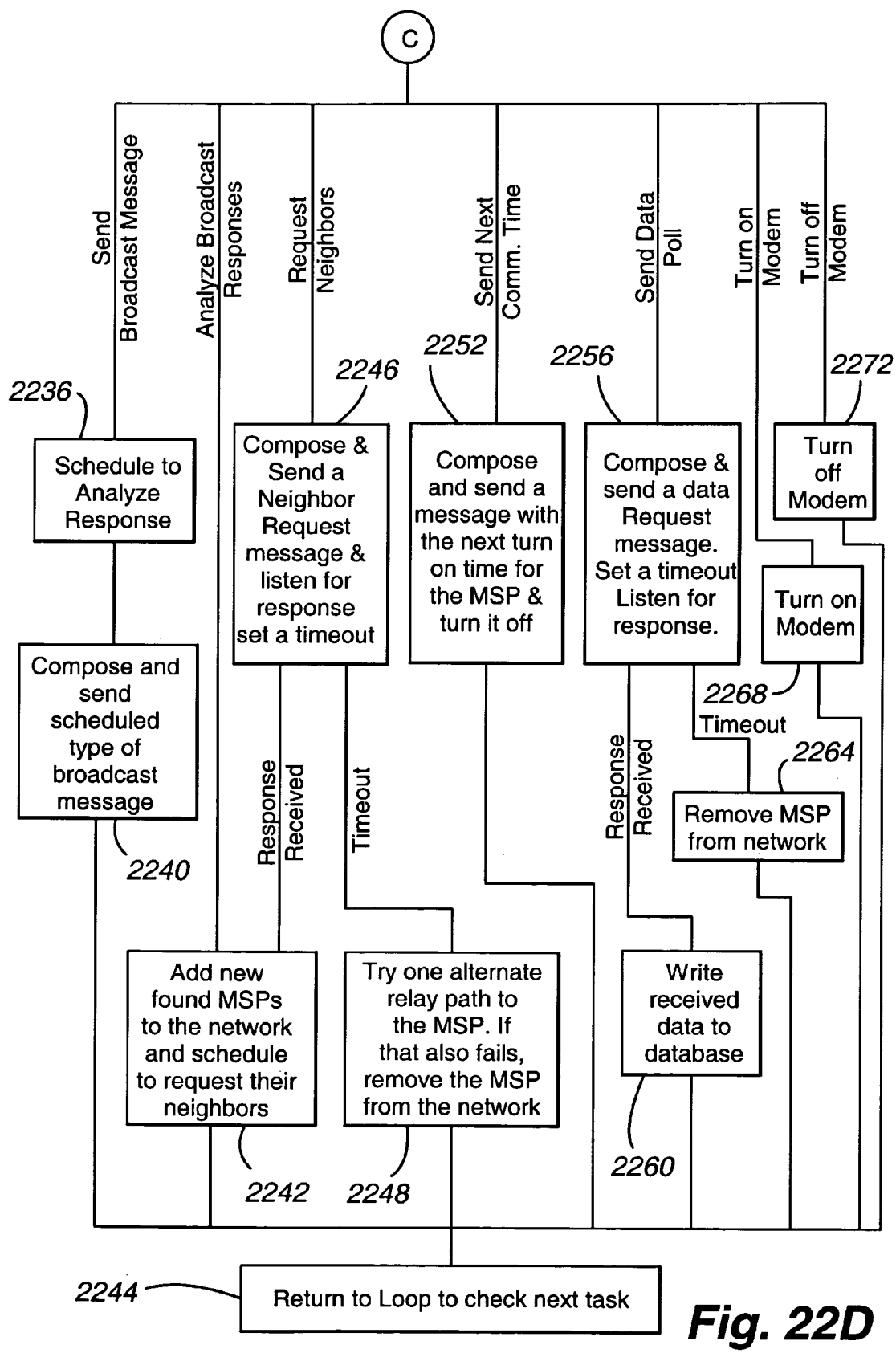

In operation and with reference to FIG. 19, during a first time interval 1900*a* first transducer ($S_1$) in a pair ($S_1$ and $S_2$) is activated as a transmitter and the transmitted ultrasound signal is received by the other second transducer ($S_2$) in the pair. During a second time interval 1904, the second transducer ($S_2$) then is fired as the transmitter and the transmitted ultrasound signal is received by the first transducer ($S_1$). During the first and second time intervals 1900 and 1904, both of the transducers ($S_3$ and $S_4$) in the second pair are inactive. During a third time interval 1908, the third transducer ($S_3$) in the second pair is fired as the transmitter and the transmitted signal is received by the fourth transducer ($S_4$) of the second pair. During a fourth time interval 1912, the fourth transducer ($S_4$) then is fired as the transmitter and the transmitted ultrasound signal is received by the third transducer ($S_3$). During the third and fourth time intervals 1908 and 1912, both of the transducers ($S_1$ and $S_2$) in the first pair are inactive.

The wind speed vector for each pair of transducers is determined based on the time-of-flight of the sonic or ultrasonic energy from the emitting transmitter to the receiver. The use of orthogonal pairs of piezoelectric transducers permit the wind speed and direction to be determined. In each pair of transducers, the sonic or ultrasonic energy is sent in opposing directions to take into account signal attenuation at higher wind speeds. The speed of sound can be determined from standard tables based on temperature and relative humidity.

The wind speed and direction are determined using the various transducer measurements. As noted, the anemometer includes four ultrasonic transducers arranged in two orthogonal pairs. Each pair sends two ultrasonic pulses, one in each direction. The times of transit of the pulses are measured with a resolution of 50 nanoseconds. The incoming pulse is amplified such that the second peak of the waveform is detected by means of a threshold triggered circuit. The subsequent zero cross point of the waveform is utilized to determine the total time of transit for the ultrasonic pulse. Once the two transit times representing the two opposite directions, have been discerned, the wind speed is calculated using the following equation:

$$S = \frac{d}{2}\left(\frac{1}{t_1} - \frac{1}{t_2}\right)$$

Where
S=wind speed
$t_1$=pulse transit time in direction 1
$t_2$=pulse transit time in direction 2
d=distance traveled In the case of high wind speeds it has been found that the pulse traveling in the upwind direction is attenuated to the extent that it cannot be reliably used in the above equation. This condition is indicated by the non-symmetrical characteristics of the upwind and downwind transit times. Normally the upwind and downwind transit times deviate an equal amount from the zero wind condition. When a high wind speed is detected the following equation is used instead:

$$t = t_o \frac{\sqrt{1 + \frac{T_o}{273}}}{\sqrt{1 + \frac{T_1}{273}}}$$

$$S = \frac{d}{2}\left(\frac{1}{t_1} - \frac{1}{t_s}\right)$$

Where
$t_0$=transit time during calibration (no wind)
$T_0$=Temperature during calibration in ° C.
$T_1$=Temperature at time of measurement The result is two vectors which represent wind speed projected along the two axes of measurement. Wind speed and direction relative to the orientation of the sensor is then calculated using the following algorithm:

If $S_1=0$ and $S_2>0$ then
$\quad D=90$

If $S_1=0$ and $S_2<0$ then
$\quad D=270$

If $S_1>0$ and $S_2=0$ then
$\quad D-0$

If $S_1<0$ and $S_2=0$ then
$\quad D=180$

If $S_1>0$ and $S_2>0$ then $$D = \operatorname{TAN}^{-1}\left(\frac{S_1}{S_2}\right)$$

If $S_1<0$ and $S_2>0$ then $$D = 90 + \operatorname{TAN}^{-1}\left(\frac{S_1}{S_2}\right)$$

If $S_1<0$ and $S_2<0$ then $$D = 180 + \operatorname{TAN}^{-1}\left(\frac{S_1}{S_2}\right)$$

If $S_1>0$ and $S_2<0$ then $$D = 270 + \operatorname{TAN}^{-1}\left(\frac{S_1}{S_2}\right)$$

$$S = \sqrt{S_1^2 + S_2^2}$$

Where
$S_1$=wind speed in direction 1
$S_1$=wind speed in direction 2
D=Direction Final absolute wind direction is determined by adding the compass orientation of the wind sensor.

$$D_{absolute} = D + D_{compass}$$

If $D \geq 360$ then $$D = D - 360$$

Electrically, each transducer has a separate and discrete power circuit for the transmission mode and all of the transducers have a common multiplexed circuit for the receiving mode. The use of multiplexed receivers can provide relatively low noise levels in the received signal at a much reduced cost (compared to using a non-multiplexed circuit).

A diagram depicting the components of a wind speed and direction measurement circuit in accordance with embodiments of the present invention is illustrated in FIG. 16. As shown in FIG. 16, each piezoelectric transducer 1100a–d is interconnected to the wind speed and direction circuit 1600 at a corresponding connector 1604a–d. During activation of a transducer 1100 as a transmitter, a power pulse is provided by a transducer driver sub-circuit 1608. As shown in FIG. 16, each transducer 1100 is associated with a transducer driver sub-circuit 1608. In operation, the inductor 1612 included in each transducer driver sub-circuit 1608 is discharged when the wind speed and direction microprocessor 1616 turns off the transducer driver sub-circuit field effect transistor 1620. The resulting voltage pulse causes the associated transducer 1100 to chirp (i.e., to emit an ultrasonic signal). In accordance with embodiments of the present invention, the voltage produced when the inductor 1612 is discharged is about 500 Volts.

In order to prevent the voltage pulse produced by the transducer driver circuits 1608 from reaching the receiver circuitry 1644, each transducer 1100 (and thus each transducer driver circuit 1608) is associated with an anti-transmit receive (ATR) sub-circuit or switch 1624. In general, an ATR switch 1624 is open when a corresponding transducer 1100 is being provided with an activation pulse by a transducer driver circuit 1608. The ATR switch is closed while an associated transducer 1100 is operating as a receiver. In the embodiment illustrated in FIG. 16, each anti-transmit receive switch 1624 includes three transistors 1628, 1632 and 1636. During operation of an associated transducer 1100 as a transmitter, the ATR switch 1624 for that transducer 1100 switches off by turning off the first two transistors 1628 and 1632, and turning on the third transistor 1636. While a transducer 1100 is operating as a receiver, the first 1628 and second 1632 transistors are turned on, and the third transistor 1636 is turned off, allowing a received signal to be passed to a multiplexer 1640. As shown in FIG. 16, the operation of the transistors 1628—1636 can be controlled by the wind speed and direction microprocessor 1616. Furthermore, in the embodiment illustrated in FIG. 16, operation of the third transistor 1636 can be performed using the same signal as is provided to the field effect transistor 1620 of the corresponding transducer driver sub-circuit 1608.

As can be appreciated by one of skill in the art from the description provided herein, typically no more than one transducer 1100 will operate as a receiver at any one point in time. As noted above, the signal from a transducer 1100 operating as a receiver is passed by the corresponding ATR switch 1624 to the multiplexer 1640. The multiplexer 1640 allows a single receiver circuit 1644 to be shared by the transducers 1100. Accordingly, the multiplexer 1640 provides a received signal from a selected transducer 1100 operating as a receiver to the receiver circuit 1644.

In general, the receiver circuit in the embodiment illustrated in FIG. 16 includes a number of amplifier and filter stages. In particular, a receive signal passed by the multiplexer 1640 is first provided to a pre-amplifier 1648 having a fixed gain amount. After pre-amplification, the received signal is passed through a bandpass amplifier 1652, implemented by a pair of operational amplifiers and associated resistors and capacitors. Next, the signal is passed to an automatic gain control amplifier 1656. The amount of gain applied by the automatic gain control amplifier 1656 is controlled by an automatic gain circuit 1660. The output from the automatic gain control circuit 1656 is a pulse having a normalized amplitude.

From the automatic gain control amplifier 1656, the received pulse is provided to a peak detector 1664, which provides a signal to the wind speed and direction microprocessor 1616 related to the amplitude of the received signal. The signal from the automatic gain control amplifier 1656 is also provided to a post amplifier 1668, and from there to a dual edge detector 1672. The dual edge detector 1672 detects the leading edge of the return pulse, and provides a signal to the wind speed and direction microprocessor 1616 indicating that the leading edge of the return pulse has been received. The wind speed and direction microprocessor 1616 can then calculate the speed and direction of the wind based on the difference between the time at which the transmitting transducer 1100 was activated to transmit a pulse and the time that the leading edge of the signal generated by the receiving transducer 1100 is received. In accordance with embodiments of the present invention, the wind speed and direction microprocessor 1616 includes or is associated with a clock that generates a tick every 50 nanoseconds, allowing wind speed to be measured at a resolution of 0.1 miles per hour.

The housings of the upper and lower members 512 and 516 are designed to isolate the wind measurement chamber 720 located between the upper and lower members 512 and 516. The peripheral edge 724 of the upper member 512 is sloped outwardly or is bowl-shaped to "cut" through the wind and isolate the chamber 720 from wind turbulence, which can skew the measurement. Likewise, the peripheral edge 728 of the lower member 516 is radiused to direct the wind smoothly into the chamber. This is particularly important when the control unit 200 is not level due to the unevenness of the surface supporting the lower member 516.

Figure 13:
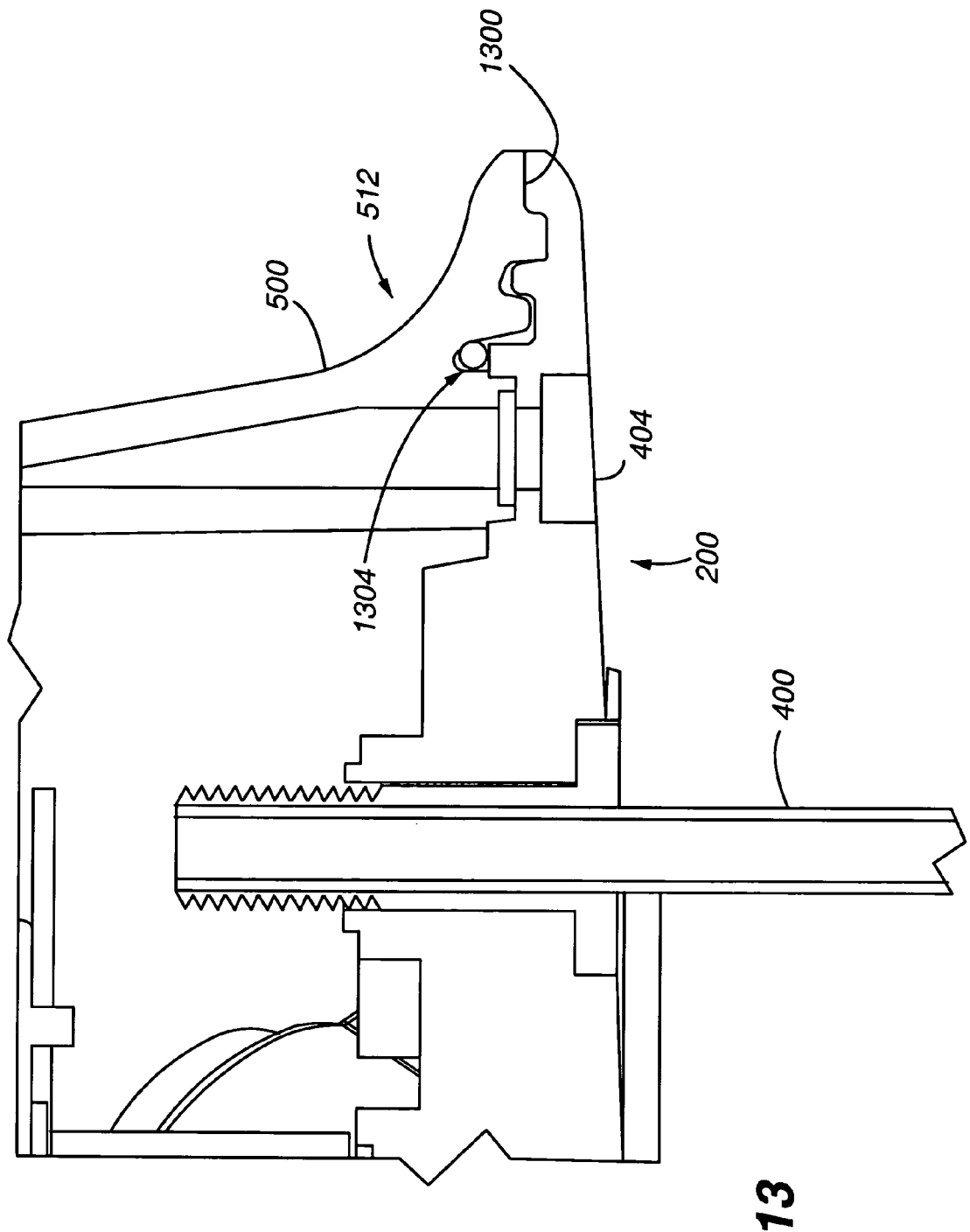
FIG. 13 is a cross-sectional view of the control unit taken along line 13—13 of FIG. 6.
Figure 14:
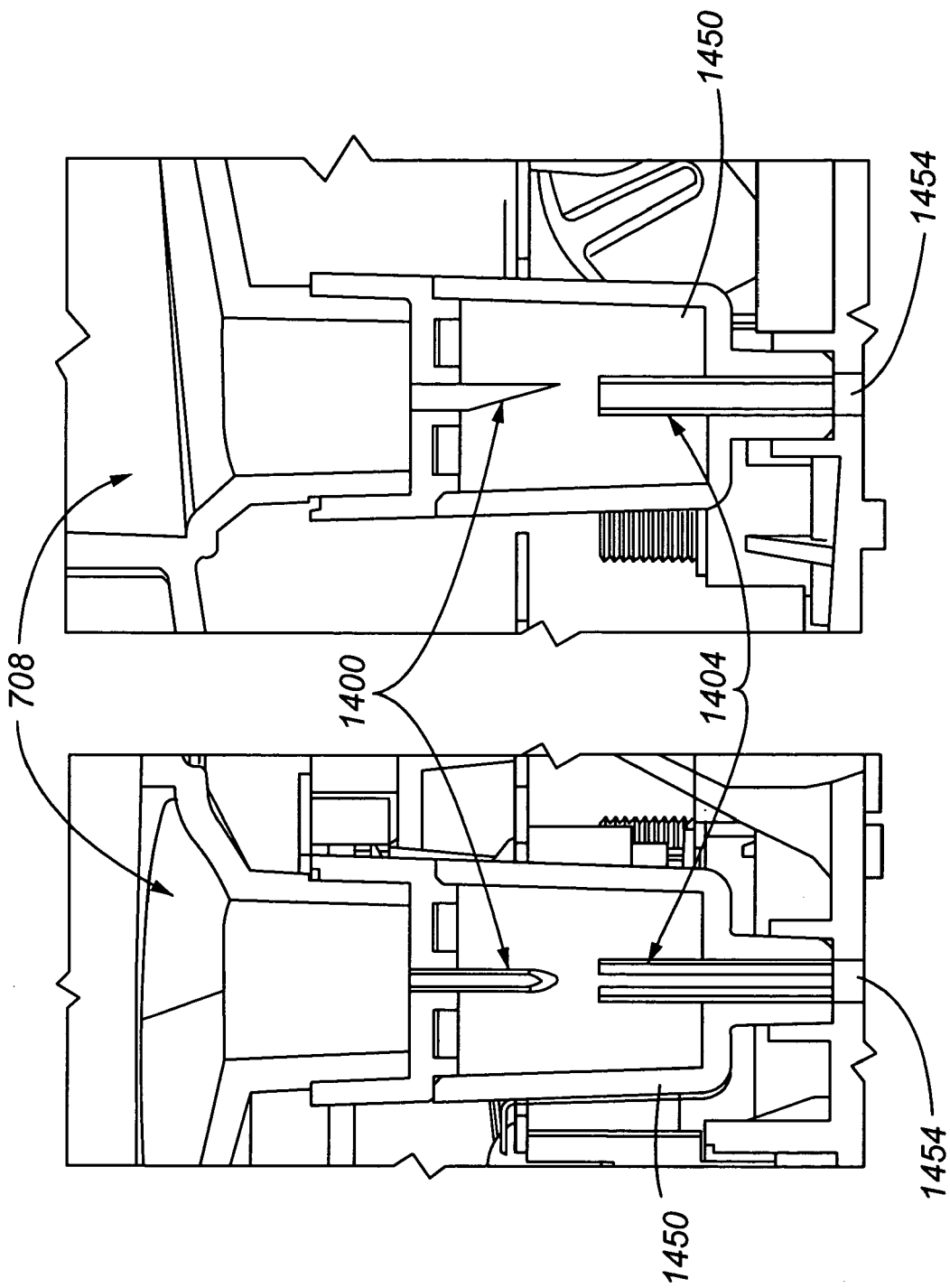
FIGS. 14A and 14B depict cross-sectional views taken along line 14—14 of FIG. 6 of the rain gauge assembly according to an embodiment of the present invention.
Figure 15:
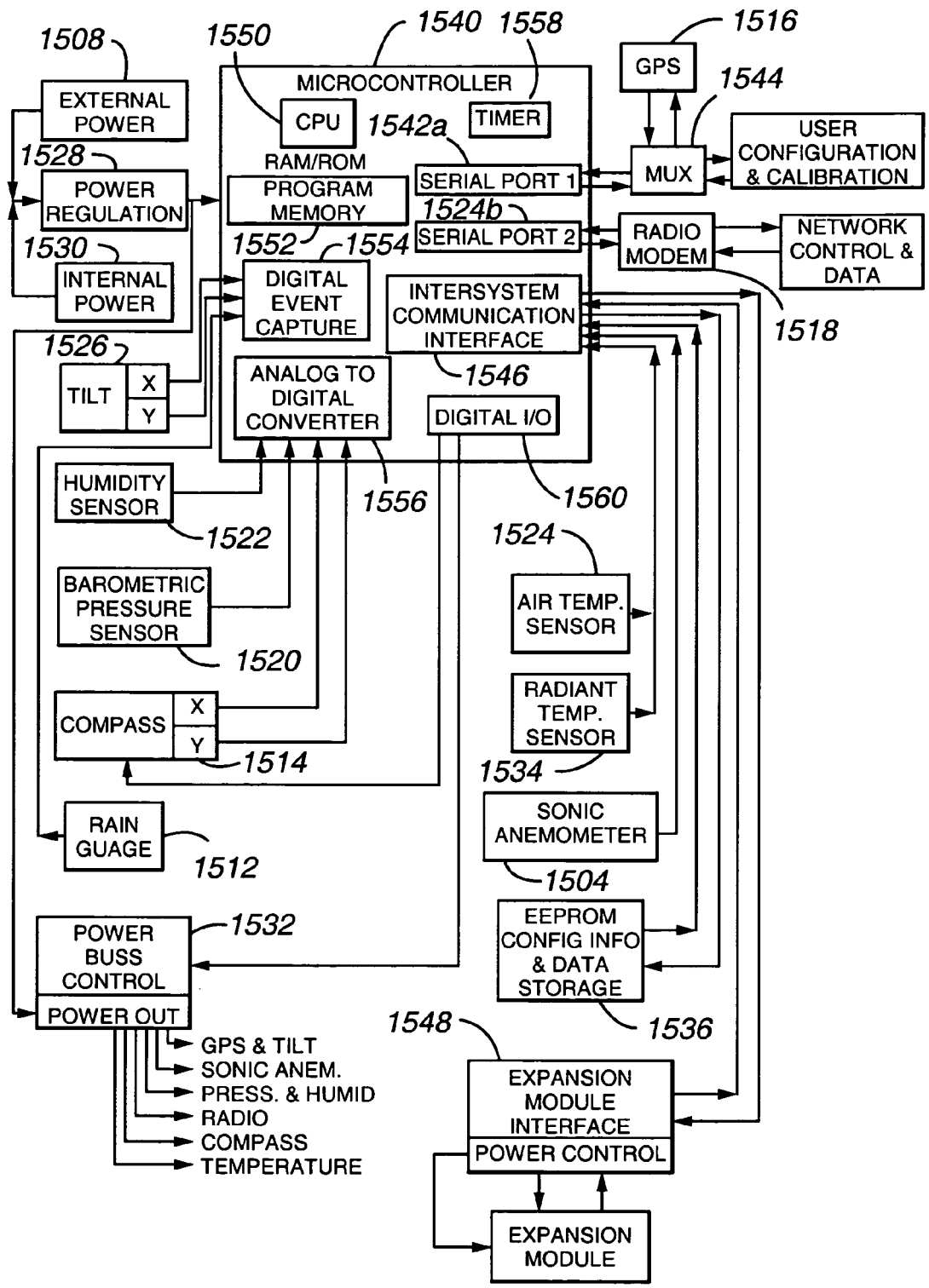
FIG. 15 is an electrical flow schematic of the control unit of FIG. 5.

The sealing of the upper member member 512 interior from terrestrial fluids is illustrated in FIG. 13. As can be seen from FIG. 13, the upper housing member 500 engages the lower housing member 404 at a peripheral edge using a nonlinear mating surface 1300. The mating surface 1300, being nonlinear and irregular in cross-section provides an elongated flow path for terrestrial fluids to enter the interior. A silicon gasket 1304 provides further sealing to inhibit the entry of terrestrial fluids into the interior of the upper member 512.

The Network Topology Mapping Algorithm

Figure 2:
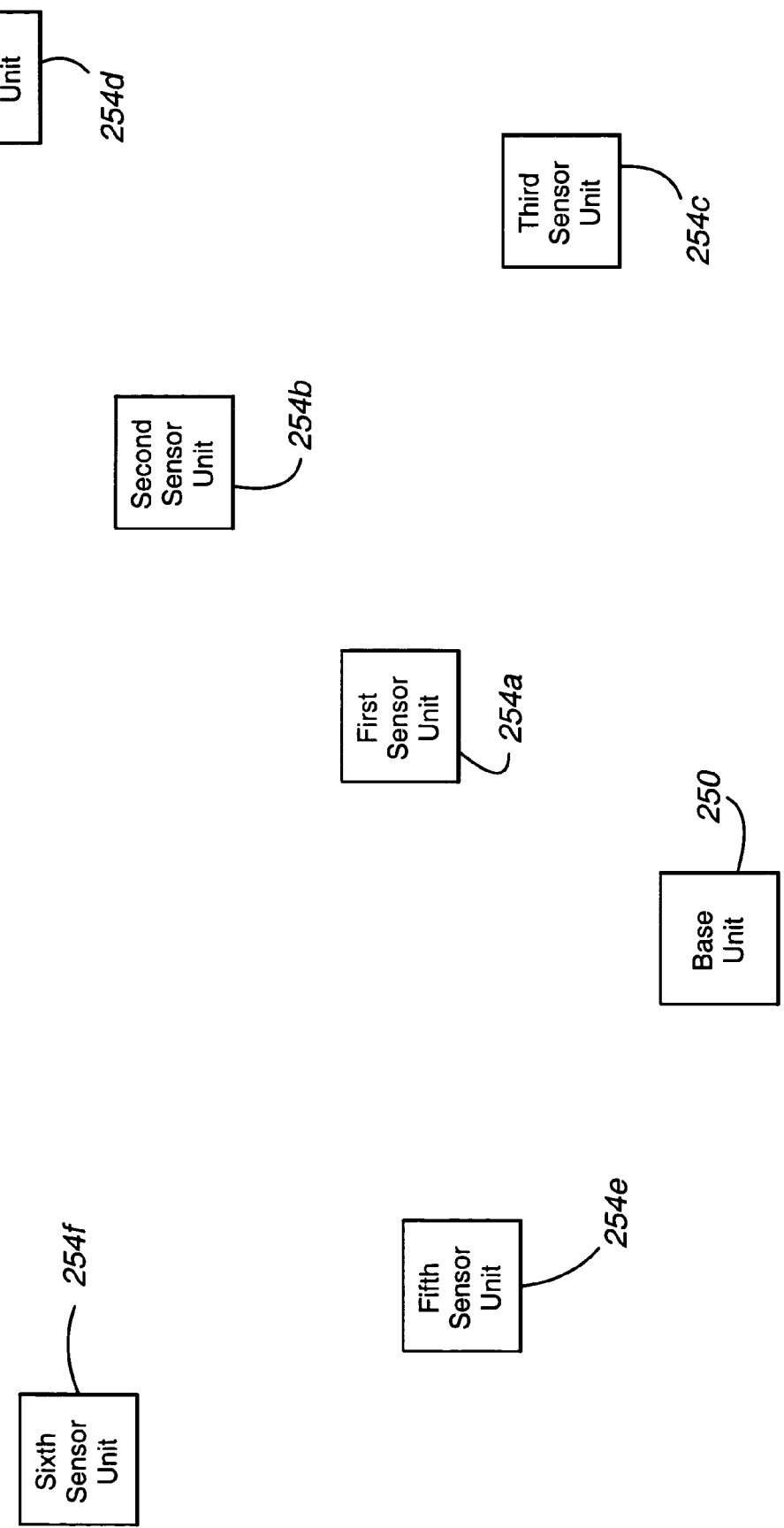
FIG. 2 depicts a further wireless network according to an embodiment of the present invention.

The base unit operates in three modes, namely a broadcast mode, a discovery mode, and a data polling mode. With reference to FIG. 2 in the broadcast mode, the base unit 250 polls in sequence each of the sensor units or nodes 254*a–f* to ascertain their respective statuses. In the discovery mode, the base unit 250 polls each of the sensor units 254*a–f* for information regarding each of their respective neighboring sensor units. These responses permit the base unit to ascertain the network topology of the sensor units. Finally, in the data polling mode the base unit 250 requests measurement data from each of the discovered sensor units 254. To conserve power, each of the sensor units 254*a–f* is sleeping or partially deactivated until a broadcast message is received from the base unit 250. The sensor unit 254, upon receiving a broadcast message directed to it or another sensor unit 254 or at a commanded time, powers up and listens for responses from neighboring sensor units 254. The sensor unit 254, upon receiving a data polling request, powers up, or at a commanded time, collects the data and transmits the data to the base unit 250. After completing the data collection phase, the sensor unit 254 turns off its power to most of its components and monitors for the next communication time received in a command signal from the base unit 250 or awaits the next scheduled activity. In other words, the base unit 250 commands each node to turn off and provides a "wake up" time or event for each node to turn its power back on and wait for a command to transmit data or transmit data to the base unit 250. The powered up and powered down operational modes of the sensor units 254 can provide substantial energy savings, which is important for portable sensor units having limited power capacity.

For widespread networks, each of the sensor units 254 can act as a repeater of command signals/requests transmitted to another sensor unit 254. Each sensor unit 254 maintains a listing of adjacent sensor units 254. For example, when a signal/request is received by the first sensor unit 254*a* that is intended for the second sensor unit 254*b* in the first sensor unit's list of adjacent units the first sensor unit 254*a* may forward the signal/request to the second sensor unit 254*b*. Alternatively, the base unit 250, based upon the discovered network topology, may request a sensor unit 254 to forward the signal/request to a specific destination node.

In discovering and configuring network topology, the base unit 250 can perform load balancing such that a plurality of nodes are identified as intermediate nodes for one or more other nodes and by redefining the membership of predetermined sets or branches of sensor units. If one of the intermediate nodes malfunctions or runs out of power, the other intermediate nodes may be used as intermediate repeating stations for distant nodes.

Figure 23:
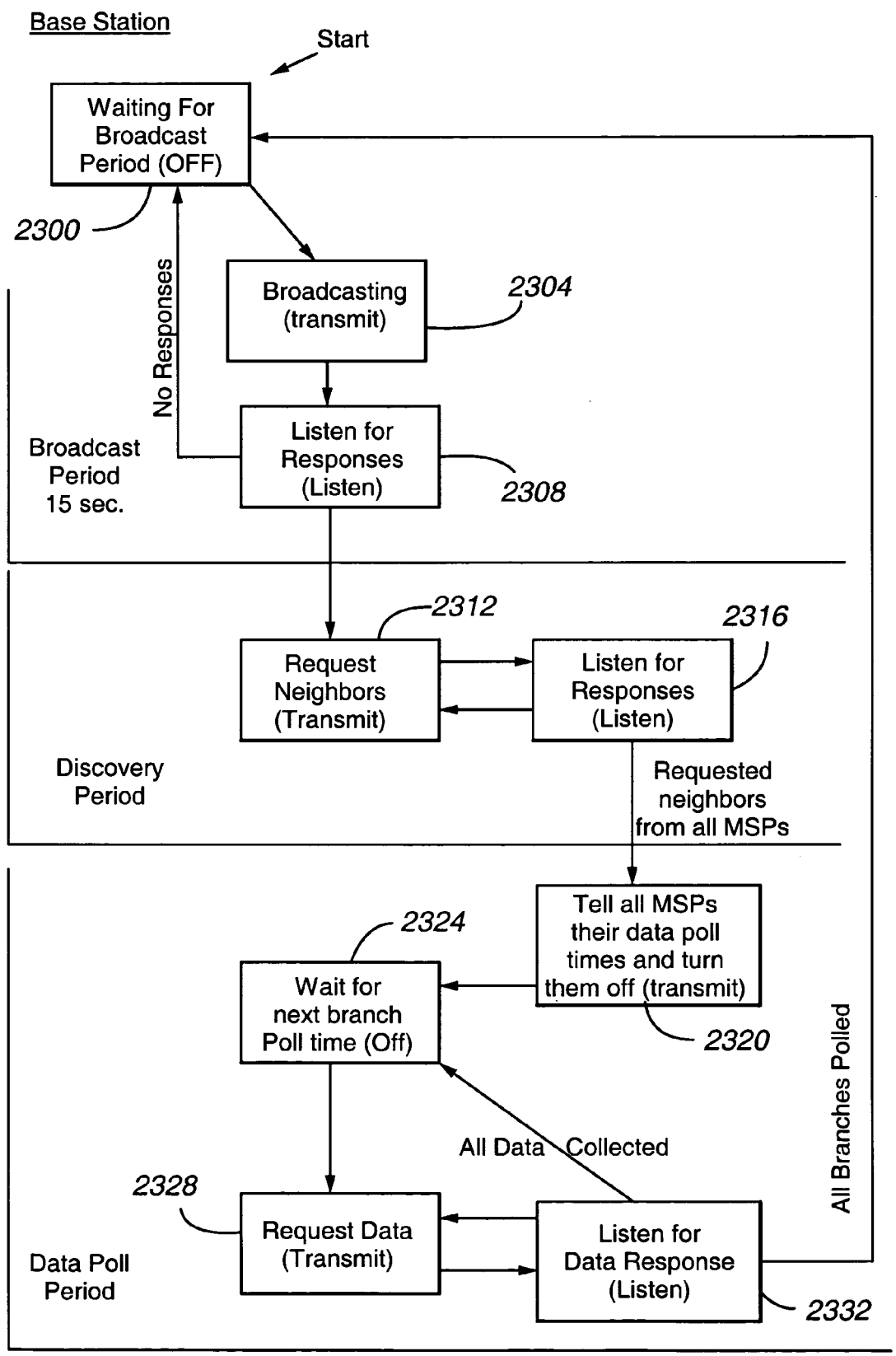
FIG. 23 is a flowchart depicting the temporal operation of the base unit.

FIG. 23 is a higher level depiction of the performance of the broadcast, discovery and data polling periods.

In operation 2300, the base unit 250 waits for the broadcast initiation signal to be received. The signal is generated based on the timing information received from the timer/clock 1558. Until the signal is received, the base unit 250 is typically powered down or has most of its components turned off. In response to receiving the signal, the base unit 250 in operation 2304 broadcasts during a broadcast period a message requesting a response from each node 254*a–f*. When the broadcast period is over, the base unit 250 in operation 2308 listens during a predetermined listening period for responses from the various nodes. If no responses are received from one or more selected nodes (or from any node if all nodes are selected) during the listening period, the base unit 250 repeats operation 2300. If responses are received from each of the selected nodes, the base unit 250 proceeds to operation 2312.

In operation 2312, the base unit 250 requests each responding node 254 to identify its corresponding neighboring nodes. The "neighboring nodes" refer to a set of nodes 254 deemed to be within some predetermined distance of the selected node 254. The set of neighboring nodes 254 may be any node transmitting a signal heard by the selected node 254. In other words, whenever a node 254 transmits a signal, any other node 254 that receives the signal (even though the signal was not directed to that node) identifies the sending node 254 as a "neighbor". The received signal could be required to have a minimum signal strength (or minimum signal-to-noise ratio) for the sending node 254 to be considered as a neighbor. The set of neighboring nodes may be a set of nodes 254 identified by the base unit as being the nodes 254 neighboring the selected node 254. The requests are typically sent at differing times to each node 254 identified in operation 2308.

In operation 2316, which is performed after each request is sent the base unit 250 listens for a listening period for a response from each of the polled nodes 254. When the polled node responds or if no response is received, the base unit 250 repeats operation 2312 with respect to a next identified node 254. When all identified nodes have been polled, the base unit 250 proceeds to operation 2320.

In operation 2320, the base unit 250 sends a message to each node identified in operation 2308 and to each neighbor identified in operation 2316 informing each node of its respective data polling time(s) and turns each informed node off. This causes the informed node to "sleep" or be inactive until a data polling signal is generated in response to the timing information received from the node's timer/clock. During the "sleep" period power is supplied only for crucial operations, such as operation of the timer/clock, monitoring for receipt of a predetermined signal (which is typically performed by a hardware wake-up switch), and/or maintenance of the contents of Random-Access Memory. Typically, the radio modem 1518 is deactivated until a scheduled time for the next communication with the base unit. In this manner, power is conserved.

Typically, the nodes are divided into groups or branches for purposes of setting data polling times and conducting other operations. For example, nodes 254a–d would be a first branch and nodes 254e–f a second. Each set or branch typically corresponds to a spatially adjacent grouping of nodes in the network topology. Each node in the set can be given the same or different data polling times. When different data polling times are used, the data polling times are closely grouped around a predetermined baseline time. Each set of nodes has a different predetermined baseline time about which the nodes are grouped.

In operation 2324, the base unit 250 turns itself off and waits for a first branch data polling time to arrive. When the polling time arrives, the base unit 250 reactivates itself Meanwhile, each of the nodes 254a–d in the first branch activates itself in response to the arrival of its respective data polling time and commences collection of the requested measurement information, such as humidity, air temperature, radiant temperature, barometric pressure, wind speed and direction, and the like. The base unit 250 in operation 2328 requests each of the nodes 254a–d in the first branch to transmit to the base unit 250 the collected information. In operation 2332, the base unit 250 listens for a response containing the requested information. Operations 2328 and 2332 are repeated at different times for each of the nodes 254a–d in the first branch. When all of the nodes in the first branch have provided their respective information or failed to respond within a predetermined period of time, the base unit 250 returns to operation 2324 and waits for the second branch data polling time to arrive. Operations 2328 and 2332 are then repeated for each node in the second branch. When the base unit 250 has requested collected information from each of the nodes in each of the branches, the base unit 250 returns to operation 2300.

FIG. 17 shows the network topology data structures maintained by the base unit 250. As can be seen from FIG. 17, each sensor unit 254 has a unique unit identifier 1700 and is part of a branch, which also has a unique branch identifier 1704. A next scheduled communication time 1708 is maintained for the listed sensor unit. The next scheduled communication time 1708 can be a broadcast time or data polling time. Multiple columns can be used, one for next scheduled broadcast time and another for next scheduled data polling time. The scheduled time can be the time for the branch (as shown) or the time for the specified sensor unit. In the former case, the algorithm would have a predetermined methodology for determining the identified sensor units specific time based on the branch time. Finally, each identified sensor unit corresponds to a list 1712 of neighboring nodes in the far right column.

Figure 24:
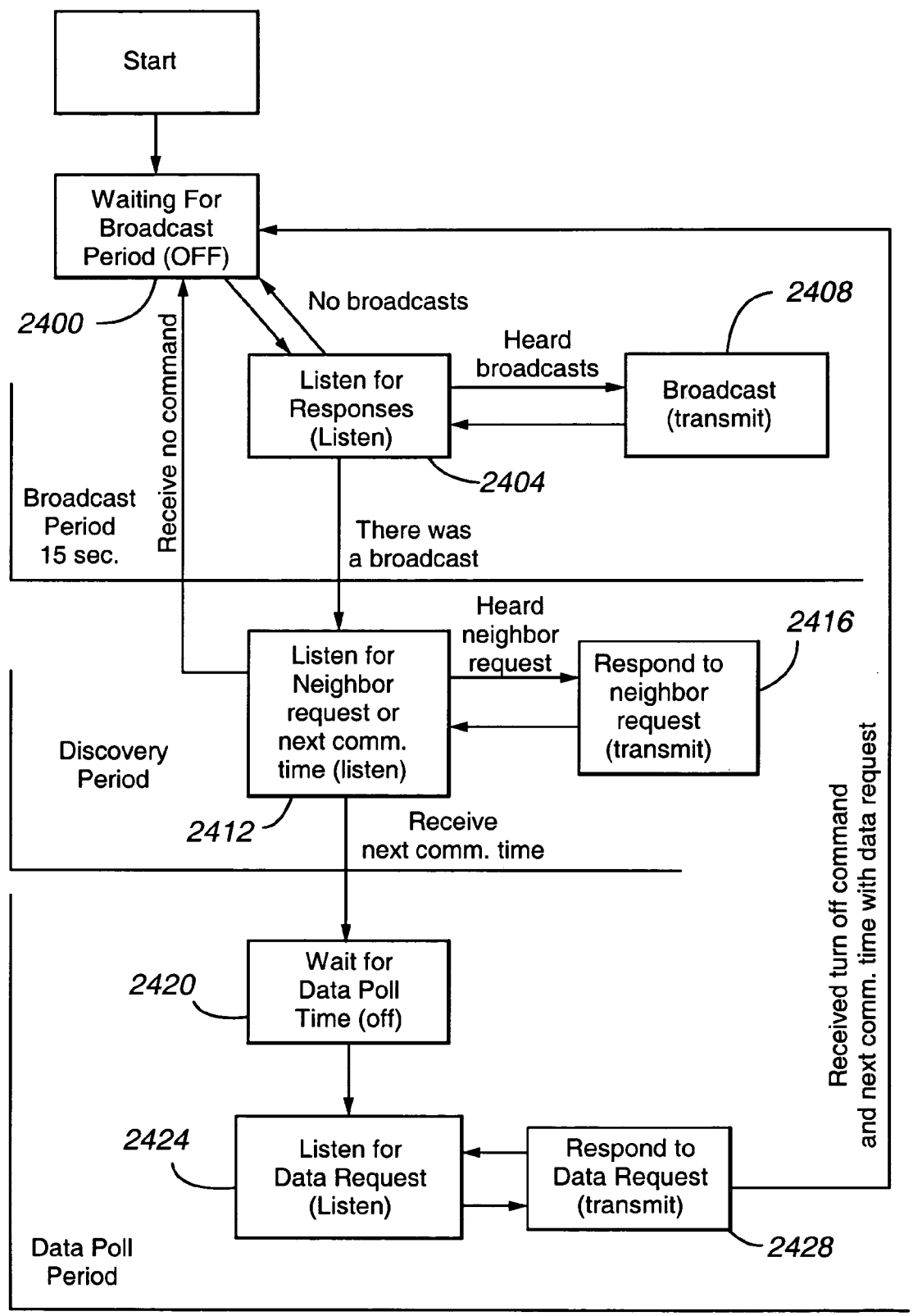
FIG. 24 is a flowchart depicting the temporal operation of the weather station nodes of the network.

FIG. 24 depicts the operations of FIG. 23 from the perspective of an exemplary node.

In operation 2400, the node 254 waits for a designated broadcast time to arrive. While waiting, the node is powered off. When the time arrives, the node, in operation 2404, listens for a broadcast signal. If a signal is not received within a predetermined period of time, the node returns to operation 2400. If a signal is received within the predetermined period of time, the node, in operation 2408, broadcasts a response and proceeds to operation 2412.

In operation 2412, the node 254 listens for a neighbor discovery request transmitted by the base unit or for scheduling of a next communication (data polling) time. When a neighbor request is received, the node in operation 2416 responds to the neighbor request by forwarding its list of neighbors to the base unit 250 and returns to operation 2412. If no neighbor request is received within a predetermined period and if no command is received scheduling a next communication (data polling) time, the node returns to operation 2400. When the next communication (data polling) time is scheduled and whether or not a neighbor request is received, the node proceeds to operation 2420.

In operation 2420, the node 254 waits for the data polling time to arrive. While waiting, the node is powered off. When the time arrives, the node, in operation 2424, powers up, collects the requested information, and listens for a data request to be transmitted to it from the base unit. When received, the node in operation 2428 responds to the data request by transmitting the requested information. The node then waits for a command to turn itself off and to schedule a next communication time for a data polling activity. When received, the node returns to operation 2400.

Figure 18:
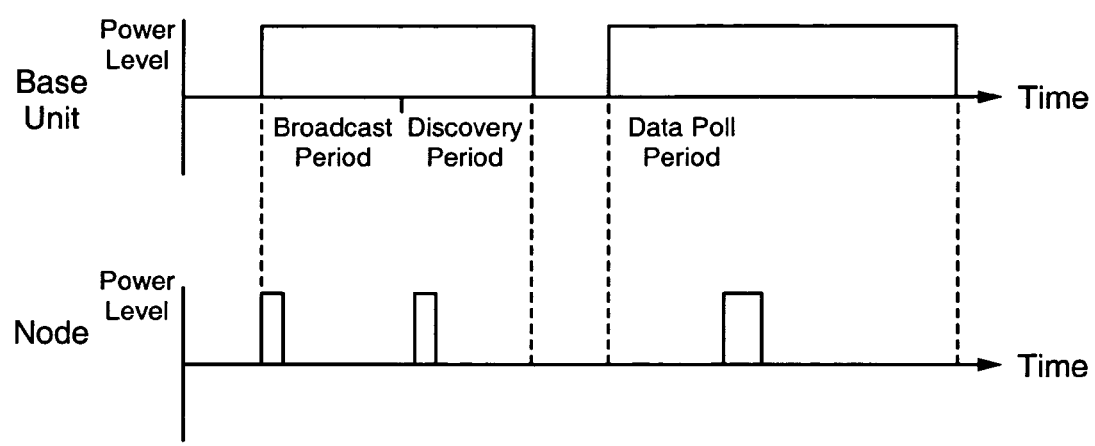
FIG. 18 depicts the intermittent operation of the base unit and sensor unit nodes according to an embodiment of the present invention.

The power savings from this procedure is shown in FIG. 18. As can be seen from the figure, the base unit is powered down or off before the broadcast period and between the conclusion of the discovery period and beginning of the data poll period. A representative node is powered off during most of the time except when it must respond to the base unit. Such conservation of power can substantially prolong the battery life of the nodes.

FIGS. 22A–D provide a more detailed depiction of the operation of the base unit. A similar flowchart can be used for each of the nodes.

In step 2200, the base unit initializes variables and schedules itself to turn on for the first broadcast period. In step 2204, the base unit enters a loop that checks for any scheduled tasks. Scheduled tasks include sending a broadcast message, analyzing broadcast responses, requesting neighbors, sending a next scheduled communication time, sending a data polling request, and turning on and off the radio modem 1518. The modem is turned off when the base unit (and nodes) are powered down.

When no scheduled tasks are to be performed, the base unit in step 2208 schedules tasks based on the base unit state. That is, tasks are scheduled based on whether the base unit is in the discovery mode or data polling mode.

When the base unit is in the discovery mode (or has just completed discovering the network), the base unit, in step 2212, determines whether or not the discovered network topology data structure is empty or unpopulated (or has less than a determined degree of completion) or not empty or populated (or has at least a determined degree of completion). When the network topology data structure is empty, the base unit proceeds to step 2216 and schedules itself to turn on and broadcast at a next broadcast period. The base unit then returns to the loop (or step 2204) checking the next task. When the network topology data structure is not empty, the base unit changes its state from the discovery mode to the data polling mode and in step 2220 schedules (by assigning a specific branch polling time) each network branch to turn on to report its data. In step 2222, the base unit 250 schedules (by assigning a node-specific polling time) each node in the selected branch to collect data. In step 2224, the base unit 250 notifies each node of its corresponding node-specific polling time and then commands them to turn off.

Returning to step 2208, when the base unit is in the data polling mode (or has just completed the data polling mode), the base unit, in step 2228 changes its state and schedules an appropriate type of network discovery. When the network topology data structure is empty (or has less than a determined degree of completion), the base unit in step 2230 schedules a full network discovery (during the next broadcast period). When the network topology is not empty (or has at least the determined degree of completion), the base unit in step 2232 schedules a partial network discovery. Compared to a full discovery in which all nodes are requested to respond, in a partial discovery only selected branches or sets of nodes (and less than all of the nodes) are to be requested to broadcast and identify their neighbors. After completing either of steps 2230 or 2232, the base unit 250 returns to the loop checking the next task (or returns to step 2204).

Returning again to step 2204, when a scheduled task exists the base unit sets a timer to go off at the scheduled time. After the timer goes off or in the event that a sequential task exists, the base unit proceeds to step 2234 and executes the task as discussed below.

When the task is to send one or more broadcast messages, the base unit, in step 2236, schedules a time to analyze the responses to the broadcast message(s) and composes and sends a scheduled-type of broadcast message and, in step 2240, returns to the loop checking the next task (or returns to step 2204). The broadcast message can be addressed to groups of sensor units or to a specified sensor unit, depending on the application.

When the task is to analyze one or more broadcast responses, the base unit, in step 2242, adds any newly found (responding) nodes to the network topology model, removes non-responding nodes from the network topology model, and schedules a time to request the newly discovered nodes' neighbors. In step 2244 the base unit returns to the loop checking the next task (or returns to step 2204).

When the task is to request neighbors, the base unit, in step 2246, composes and sends a neighbor request message to each selected node(s) and listens for a response. The base unit 250 also sets a timeout period or predetermined listening time. When a response is received within the predetermined listening time, the base unit 250 performs step 2242. When a response is not received within the predetermined listening time, the base unit in step 2248 attempts at least one alternate relay path to the non-responding node. The relay path uses one or more other intermediate node(s) to rebroadcast the message. In one configuration, a message can be forwarded to a distant node by using a daisy-chain-type communication methodology bypassing the message from intermediate node-to-intermediate node. In this manner, a lower transmission power can be used to reach distant nodes over large distances. To avoid overuse of an intermediate node and consequent premature power loss and/or to avoid a loss of communication with a selected node due to the failure of an intermediate node, the set of intermediate nodes used to reach a selected node can be changed periodically to effect a type of load balancing. If no response is received within the predetermined listening time using the relay path, the non-responding node is removed from the model. In step 2244, the base unit returns to the loop checking the next task (or returns to step 2204).

When the task is to send a next communication time, the base unit in step 2252 composes and sends a message with the next turn-on time for each selected node and commands the node to turn itself off after the node schedules the time. In step 2244, the base unit returns to the loop checking the next task (or returns to step 2204).

When the task is to send a data polling message, the base unit in step 2256 composes and sends a data request message and sets a timeout or predetermined time to listen for a response. When a response is received within the predetermined time, the base unit 250 in step 2260 writes the received data to the memory 1536. The contents of the base unit's memory can be provided to the user through a wireless and/or wired communication path When no response is received within the predetermined time, the base unit in step 2264 removes the node from the network topology model. In step 2244, the base unit returns to the loop checking the next task (or returns to step 2204).

When the task is to turn on the radio modem 1518, the base unit 250 generates a signal to turn on the modem and, in step 2268, returns to the loop checking the next task (or returns to step 2204).

When the task is to turn off the radio modem 1518, the base unit 250 in step 2272 generates a signal to turn off the modem and, in step 2244, returns to the loop checking the next task (or returns to step 2204).

A number of variations and modifications of the invention can be used. It would be possible to provide for some features of the invention without providing others.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A weather station, comprising:
   a plurality of sensors;
   a controller for processing measurement information from the sensors; and
   a memory for storing processed measurement information, wherein the sensors comprise:
   an anemometer for measuring wind speed;
   a rain gauge for measuring rainfall;
   a compass for determining the orientation of the weather station relative to the earth's magnetic field;
   a Global Positioning System receiver for determining a spatial location of the weather station;
   a barometric pressure sensor for measuring the barometric pressure; and
   an air temperature sensor for measuring the ambient air temperature and wherein:
   the controller and memory are contained in a control unit;
   a first sensor is contained in a first sensor module;
   a second sensor is contained in a second sensor module;
   the first and second sensor modules have at least corresponding first and second connection interfaces, respectively;
   the control unit has at least a third connection interface;
   each of the connection interfaces is configured to connect interchangeably to any of the other connection interfaces; and
   the second sensor module is positioned between the first sensor module and control unit.

2. The weather station of claim 1, wherein the sensor further comprises:
   a humidity sensor for measuring humidity;
   a level for determining an orientation of the weather station relative to the earth's gravitational field; and
   a radiant temperature sensor for measuring radiant temperature.

3. The weather station of claim 1, further comprising:
   a wireless modem for wirelessly receiving commands and transmitting measurement information.

4. The weather station of claim 1, wherein the rain gauge comprises:
   (a) an inlet for collecting rain drops;
   (b) an outlet for removing collected rain drops;
   (c) a first conduit in communication with the inlet; and
   (d) a second conduit in communication with the outlet, wherein adjacent ends of the first and second conduits are spaced from one another and wherein at least one of the following is true:
   (i) the adjacent ends of the first and second conduits are angled relative to a selected horizontal plane; and
   (ii) the second conduit comprises a longitudinal slot extending downwardly from the end of the second conduit.

5. The weather station of claim 4, wherein (i) is true.

6. The weather station of claim 4, wherein (ii) is true.

7. The weather station of claim 4, wherein the anemometer comprises:
   first and second transducers positioned along a first axis; and
   third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal.

8. The weather station of claim 1, further comprising an upper body member and a lower body member, the upper and lower body members being separated by an open space, wherein a plurality of support members engage the separate the upper and lower body members, and wherein the anemometer and air temperature sensor are positioned in the open space between the upper and lower body members.

9. The weather station of claim 8, wherein a peripheral edge of the upper body member adjacent to the open space is flared outwardly relative to an adjacent portion of the upper body member and wherein a peripheral edge of the lower body member is arcuate in cross-section to direct wind into the open space between the upper and lower body members.

10. The weather station of claim 8, wherein a power source for the station is located in the lower body member and power is conveyed to the upper body member through the support members.

11. The weather station of claim 8, wherein the lower body member comprises a spool for rope.

12. The weather station of claim 8, wherein the upper body member comprises the controller, memory, anemometer, rain gauge, compass, and Global Positioning System receiver and wherein the lower body member comprises the primary power source.

13. The weather station of claim 1, wherein the controller and memory are contained in a control unit, wherein a first sensor is contained in a first sensor module, and wherein a second sensor is contained in a second sensor module, wherein the first and second sensor modules have at least corresponding first and second connection interfaces, respectively; wherein the control unit has at least a third connection interface, wherein each of the connection interfaces is configured to connect interchangeably to any of the other connection interfaces, and wherein the second sensor module is positioned between the first sensor module and control unit, wherein the anemometer comprises:
   first and second transducers positioned along a first axis; and
   third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal, wherein the rain gauge comprises:
   (a) an inlet for receiving precipitation;
   (b) an outlet for removing precipitation;
   (c) a first conduit in communication with the inlet; and
   (d) a second conduit in communication with the outlet, wherein adjacent ends of the first and second conduits are spaced from one another and wherein at least one of the following is true:
   (i) the adjacent ends of the first and second conduits are angled relative to a selected horizontal plane; and
   (ii) the second conduit comprises a longitudinal slot extending downwardly from the end of the second conduit and further comprising:
   a base unit configured to operate in a network discovery mode in which network topology information is collected and a data polling mode in which sensed information is collected from selected sensor units;
   a plurality of sensor units in signal communication with the base unit, wherein the base unit and plurality of sensor units are in different locations, wherein each of the plurality of sensor units has a stored primary power supply, wherein each of the sensor units is at least partially deactivated in a first operational mode and activated in a second operational mode, and wherein each sensor unit is in the first operational mode until the occurrence of at least one of the following events:
(i) a signal is received by the sensor unit from the base unit; and
(ii) the arrival of a scheduled time to perform a specified activity, the scheduled time being received from the base unit.

14. An environmental sensing system, comprising:
a first environmental sensor module having at least a first connection interface;
a second environmental sensor module having at least a second connection interface; and
a control unit having at least a third connection interface, wherein each of the first, second, and third connection interfaces is configured to connect interchangeably to any of the other of the first, second environmental, and third connection interfaces and wherein the second sensor module is positioned between the first environmental sensor module and control unit.

15. The system of claim 14, wherein, when the first and second sensors and control unit are interconnected, the first, second, and third connection interfaces are positioned along a common axis.

16. The system of claim 14, wherein, when the first and second sensors and control unit are interconnected, the first and second sensor modules and control unit are in a stacked relationship.

17. The system of claim 14, further comprising:
a controller for processing measurement information from the sensors; and
a memory for storing processed measurement information and wherein the sensors comprise:
an anemometer for measuring wind speed;
a rain gauge for measuring rainfall;
a compass for determining orientation of the station relative to the earth's magnetic field;
a Global Positioning System receiver for determining a location of the station; and
a barometric pressure sensor for measuring barometric pressure, wherein the anemometer comprises:
first and second transducers positioned along a first axis; and
third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal, wherein the rain gauge comprises:
(a) an inlet for receiving precipitation;
(b) an outlet for removing precipitation;
(c) a first conduit in communication with the inlet; and
(d) a second conduit in communication with the outlet, wherein adjacent ends of the first and second conduits are spaced from one another and wherein at least one of the following is true:
(i) the adjacent ends of the first and second conduits are angled relative to a selected horizontal plane; and
(ii) the second conduit comprises a longitudinal slot extending downwardly from the end of the second conduit; and further comprising:
a base unit configured to operate in a network discovery mode in which network topology information is collected and a data polling mode in which sensed information is collected from selected sensor units;
a plurality of sensor units in signal communication with the base unit, wherein the base unit and plurality of sensor units are in different locations, wherein each of the plurality of sensor units has a stored primary power supply, wherein each of the sensor units is at least partially deactivated in a first operational mode and activated in a second operational mode, and wherein each sensor unit is in the first operational mode until the occurrence of at least one of the following events:
(i) a signal is received by the sensor unit from the base unit; and
(ii) the arrival of a scheduled time to perform a specified activity, the scheduled time being received from the base unit.

18. An anemometer for measuring wind speed and direction, comprising:
first and second transducers positioned along a first axis; and
third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal and wherein, based on the measurement signals received by each of the first, second, third, and fourth transducers, a wind speed and direction are determined.

19. The anemometer of claim 18, further comprising a controller operable (i) during a first time interval, to effect transmission of a first measurement signal from the first transducer to the second transducer; (ii) during a subsequent second time interval, to effect transmission of a second measurement signal from the second transducer to the first transducer; (iii) during a subsequent third time interval, to effect transmission of a third measurement signal from the third transducer to the fourth transducer; and (iv) during a subsequent fourth time interval, to effect transmission of a fourth measurement signal from the fourth transducer to the third transducer.

20. The anemometer of claim 18, wherein the first, second, third, and fourth transducers are each connected to a transmit circuit and a receive circuit and wherein the first, second, third, and fourth transducers are multiplexed together to use a common receive circuit.

21. The anemometer of claim 20, wherein each of the first, second, third, and fourth transducers has a separate transmit circuit.

22. The anemometer of claim 19, wherein the first, second, third, and fourth time intervals are discrete from one another.

23. The anemometer of claim 18, wherein the anemometer is part of an environmental sensing system, the sensing system comprising:
a first sensor module having at least a first connection interface;
a second sensor module having at least a second connection interface; and
a control unit having at least a third connection interface, wherein each of the at least a first, second, and third connection interfaces is configured to connect interchangeably to any of the other at least a first, second, and third connection interfaces and wherein the second sensor module is positioned between the first sensor module and control unit and wherein the system further comprises:
a plurality of sensors;

a controller for processing measurement information from the sensors; and
a memory for storing processed measurement information, wherein the sensors comprise:
a rain gauge for measuring rainfall;
a compass for determining orientation of the station relative to the earth's magnetic field;
a Global Positioning System receiver for determining a location of the station; and
a barometric pressure sensor for measuring barometric pressure, wherein the controller and memory are contained in a control unit, wherein a first sensor is contained in a first sensor module, and wherein a second sensor is contained in a second sensor module, wherein the first and second sensor modules have at least corresponding first and second connection interfaces, respectively; wherein the control unit has at least a third connection interface, wherein each of the connection interfaces is configured to connect interchangeably to any of the other connection interfaces, and wherein the second sensor module is positioned to any of the other connection interfaces, and wherein the second sensor module is positioned between the first sensor module and control unit, wherein the rain gauge comprises:
(a) an inlet for receiving precipitation;
(b) an outlet for removing precipitation;
(c) a first conduit in communication with the inlet; and
(d) a second conduit in communication with the outlet, wherein adjacent ends of the first and second conduits are spaced from one another and wherein at least one of the following is true:
  (i) the adjacent ends of the first and second conduits are angled relative to a selected horizontal plane; and
  (ii) the second conduit comprises a longitudinal slot extending downwardly from the end of the second conduit; and further comprising:
a base unit configured to operate in a network discovery mode in which network topology information is collected and a data polling mode in which sensed information is collected from selected sensor units; and
a plurality of sensor units in signal communication with the base unit, wherein the base unit and plurality of sensor units are in different locations, wherein each of the plurality of sensor units has a stored primary power supply, wherein each of the sensor units is at least partially deactivated in a first operational mode and activated in a second operational mode, and wherein each sensor unit is in the first operational mode until the occurrence of at least one of the following events:
  (i) a signal is received by the sensor unit from the base unit; and
  (ii) the arrival of a scheduled time to perform a specified activity, the scheduled time being received from the base unit.

24. A method for measuring wind speed and direction, comprising:
providing first and second transducers positioned along a first axis and third and fourth transducers positioned along a second axis, the first and second axes being at least substantially orthogonal;
during a first time interval, transmitting a measurement signal from the first transducer and receiving the measurement signal at the second transducer; and
during a subsequent second time interval, transmitting a measurement signal from the second transducer and receiving the measurement signal at the first transducer;
during a subsequent third time interval, transmitting a measurement signal from the third transducer and receiving the measurement signal at the fourth transducer; and
during a subsequent fourth time interval, transmitting a measurement signal from the fourth transducer and receiving the measurement signal at the third transducer wherein the signal is indicative of a wind speed and/or direction.

25. The method of claim 24, wherein the first, second, third, and fourth time intervals are discrete from one another.

26. The method of claim 24, wherein the first, second, third, and fourth transducers are each connected to a transmit circuit and a receive circuit and wherein the first, second, third, and fourth transducers are multiplexed together to use a common receive circuit.

27. The method of claim 26, wherein each of the first, second, third, and fourth transducers has a separate transmit circuit.

28. The method of claim 24, further comprising:
providing a weather station, the weather station comprising:
a plurality of sensors;
a controller for processing measurement information from the sensors; and
a memory for storing processed measurement information, wherein the sensors comprise:
an anemometer for measuring wind speed using the steps of claim 24;
a rain gauge for measuring rainfall;
a compass for determining orientation of the station relative to the earth's magnetic field;
a Global Positioning System receiver for determining a location of the station; and
a barometric pressure sensor for measuring barometric pressure, wherein the controller and memory are contained in a control unit, wherein a first sensor is contained in a first sensor module, and wherein a second sensor is contained in a second sensor module, wherein the first and second sensor modules have at least corresponding first and second connection interfaces, respectively; wherein the control unit has at least a third connection interface, wherein each of the connection interfaces is configured to connect interchangeably to any of the other connection interfaces, and wherein the second sensor module is positioned between the first sensor module and control unit, wherein the rain gauge comprises:
(a) an inlet for receiving precipitation;
(b) an outlet for removing precipitation;
(c) a first conduit in communication with the inlet; and
(d) a second conduit in communication with the outlet, wherein adjacent ends of the first and second conduits are spaced from one another and wherein at least one of the following is true:
  (i) the adjacent ends of the first and second conduits are angled relative to a selected horizontal plane; and
  (ii) the second conduit comprises a longitudinal slot extending downwardly from the end of the second conduit; and further comprising:
a base unit configured to operate in a network discovery mode in which network topology information is collected and a data polling mode in which sensed information is collected from selected sensor units;
a plurality of sensor units in signal communication with the base unit, wherein the base unit and plurality of sensor units are in different locations, wherein each of the plurality of sensor units has a stored primary power supply, wherein each of the sensor units is at least partially deactivated in a first operational mode and activated in a second operational mode, and wherein each sensor unit is in the first operational mode until the occurrence of at least one of the following events:
  (i) a signal is received by the sensor unit from the base unit; and
  (ii) the arrival of a scheduled time to perform a specified activity, the scheduled time being received from the base unit.

29. A device for collecting and measuring precipitation, comprising:
  (a) an inlet for receiving precipitation;
  (b) an outlet for removing the received precipitation;
  (c) a first conduit in communication with the inlet; and
  (d) a second conduit in communication with the outlet, wherein adjacent ends of the first and second conduits are spaced from one another and wherein at least one of the following is true:
    (i) the adjacent ends of the first and second conduits are angled relative to a selected horizontal plane; and
    (ii) the second conduit comprises a longitudinal slot extending downwardly from the adjacent end of the second conduit.

30. The device of claim 29, wherein (i) is true.

31. The device of claim 29, wherein (ii) is true.

32. The device of claim 30, wherein the angle of each of the adjacent ends of the first and second conduits ranges from about 30 to about 60°.

33. The device of claim 29, further comprising:
  a plurality of sensors;
  a controller for processing measurement information from the sensors; and
  a memory for storing processed measurement information, wherein the sensors comprise:
    an anemometer for measuring wind speed;
    a compass for determining orientation of the station relative to the earth's magnetic field;
    a Global Positioning System receiver for determining a location of the station; and
    a barometric pressure sensor for measuring barometric pressure, wherein the controller and memory are contained in a control unit, wherein a first sensor is contained in a first sensor module, and wherein a second sensor is contained in a second sensor module, wherein the first and second sensor modules have at least corresponding first and second connection interfaces, respectively; wherein the control unit has at least a third connection interface, wherein each of the connection interfaces is configured to connect interchangeably to any of the other connection interfaces, and wherein the second sensor module is positioned between the first sensor module and control unit, wherein the anemometer comprises:
      first and second transducers positioned along a first axis; and
      third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal; and further comprising:
  a base unit configured to operate in a network discovery mode in which network topology information is collected and a data polling mode in which sensed information is collected from selected sensor units;
  a plurality of sensor units in signal communication with the base unit, wherein the base unit and plurality of sensor units are in different locations, wherein each of the plurality of sensor units has a stored primary power supply, wherein each of the sensor units is at least partially deactivated in a first operational mode and activated in a second operational mode, and wherein each sensor unit is in the first operational mode until the occurrence of at least one of the following events:
    (i) a signal is received by the sensor unit from the base unit; and
    (ii) the arrival of a scheduled time to perform a specified activity, the scheduled time being received from the base unit.

34. A networked sensor system for collecting sensed information relating to an external environment, comprising:
  a base unit configured to operate in a network discovery mode in which network topology information is collected and a data polling mode in which sensed information is collected from selected sensor units;
  a plurality of sensor units in signal communication with the base unit, wherein the base unit and plurality of sensor units are in different spatial locations, wherein each of the plurality of sensor units has a stored primary power supply, wherein each of the sensor units is at least partially deactivated in a first operational mode and activated in a second operational mode, and wherein each sensor unit is in the first operational mode until the occurrence of at least one of the following events:
    (i) a signal is received by the sensor unit from the base unit; and
    (ii) the arrival of a scheduled time to perform a specified activity, the scheduled time being received from the base unit.

35. The networked sensor system of claim 34, wherein event (i) occurs.

36. The networked sensor system of claim 34, wherein event (ii) occurs.

37. The networked sensor system of claim 35, wherein, in the network discovery mode, the base unit transmits a discovery message to one or more of the sensor units, the one or more sensor units change from the first operational mode to the second operational mode, and, when a sensor unit responds to the discovery message, requests information regarding the sensor units neighboring the responding sensor unit.

38. The networked sensor system of claim 37, wherein, when a sensor unit fails to respond to a selected number of discovery messages, the sensor unit is removed from a network topology model of the networked sensor system.

39. The networked sensor system of claim 38, wherein the selected number of discovery messages comprises a first discovery message transmitted from the base unit and retransmitted by a first set of sensor units and a second discovery message transmitted from the base unit and retransmitted by a second set of sensor units, and wherein the first and second sets of sensor units have at least one uncommon member.

40. The networked sensor system of claim 36, wherein, in the data polling mode, the base unit schedules a data polling time for one or more sensor units.

41. The networked sensor system of claim 40, wherein, when the scheduled time arrives, the one or more sensor units change from the first operational mode to the second operational mode and collect sensed information relating to a corresponding external environment for subsequent transmission to the base unit.

42. The networked sensor system of claim 34, wherein the base unit and plurality of sensor units are in wireless communication with one another.

43. The networked sensor system of claim 34, wherein each sensor unit comprises:
 a plurality of sensors;
 a controller for processing measurement information from the sensors; and
 a memory for storing processed measurement information, wherein the sensors comprise:
  an anemometer for measuring wind speed;
  a rain gauge for measuring rainfall;
  a compass for determining orientation of the station relative to the earth's magnetic field;
  a Global Positioning System receiver for determining a location of the station; and
  a barometric pressure sensor for measuring barometric pressure, wherein the controller and memory are contained in a control unit, wherein a first sensor is contained in a first sensor module, and wherein a second sensor is contained in a second sensor module, wherein the first and second sensor modules have at least corresponding first and second connection interfaces, respectively; wherein the control unit has at least a third connection interface, wherein each of the connection interfaces is configured to connect interchangeably to any of the other connection interfaces, and wherein the second sensor module is positioned between the first sensor module and control unit, wherein the anemometer comprises:
 first and second transducers positioned along a first axis; and
 third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal, wherein the rain gauge comprises:
 (a) an inlet for receiving precipitation;
 (b) an outlet for removing precipitation;
 (c) a first conduit in communication with the inlet; and
 (d) a second conduit in communication with the outlet, wherein adjacent ends of the first and second conduits are spaced from one another and wherein at least one of the following is true:
  (i) the adjacent ends of the first and second conduits are angled relative to a selected horizontal plane; and
  (ii) the second conduit comprises a longitudinal slot extending downwardly from the end of the second conduit.

44. A method for collecting, using a networked sensor system, sensed information relating to an external environment, comprising:
 providing a plurality of sensor units and a base unit in wireless communication with sensor units, the base unit being configured to operate in a network discovery mode in which network topology information is collected from selected sensor units and in a data polling mode in which sensed information is collected from selected sensor units, wherein the base unit and plurality of sensor units are in different locations and wherein each of the plurality of sensor units has a stored primary power supply;
 at least partially deactivating each of the sensor units during a first time period; and
 activating each of the sensor units during a second time period upon the occurrence of at least one of the following events:
  (i) a signal is received by the sensor unit from the base unit; and
  (ii) the arrival of a scheduled time to perform a specified activity, the scheduled time being received from the base unit.

45. The method of claim 44, wherein event (i) has occurred.

46. The method of claim 44, wherein event (ii) has occurred.

47. The method of claim 44, wherein one of events (i) and (ii) has occurred and further comprising:
 deactivating each of the sensor units after one or more selected tasks have been completed.

48. The method of claim 45, wherein the network discovery mode comprises:
 the base unit transmitting a discovery message to one or more of the sensor units;
 the one or more sensor units activating in response to the receipt of the discovery message; and
 when a sensor unit responds to the discovery message, the base unit requesting information regarding the sensor units neighboring the responding sensor unit.

49. The method of claim 45, further comprising:
 when a sensor unit fails to respond to a selected number of discovery messages, the base unit removing the nonresponding sensor unit from a network topology model of the networked sensor system.

50. The method of claim 48, wherein the selected number of discovery messages comprises a first discovery message transmitted from the base unit and retransmitted by a first set of sensor units and a second discovery message transmitted from the base unit and retransmitted by a second set of sensor units, and wherein the first and second sets of sensor units have at least one uncommon member.

51. The method of claim 46, wherein the data polling mode comprises:
 the base unit scheduling a data polling time for one or more sensor units.

52. The method of claim 46, wherein, in the activating step, the one or more sensor units change from the first operational mode to the second operational mode and collect sensed information relating to a corresponding external environment for subsequent transmission to the base unit.

53. The method of claim 44, wherein the base unit and plurality of sensor units are in wireless communication with one another.

54. The method of claim 44, wherein each sensor unit comprises:
 a plurality of sensors;
 a controller for processing measurement information from the sensors; and
 a memory for storing processed measurement information, wherein the sensors comprise:
  an anemometer for measuring wind speed;
  a rain gauge for measuring rainfall;
  a compass for determining orientation of the station relative to the earth's magnetic field;
  a Global Positioning System receiver for determining a location of the station; and
  a barometric pressure sensor for measuring barometric pressure, wherein the controller and memory are contained in a control unit, wherein a first sensor is contained in a first sensor module, and wherein a second sensor is contained in a second sensor module, wherein the first and second sensor modules have at least corresponding first and second connection interfaces, respectively; wherein the control unit has at least a third connection interface, wherein each of the connection interfaces is configured to connect interchangeably to any of the other connection interfaces, and wherein the second sensor module is positioned between the first sensor module and control unit, wherein the anemometer comprises:

first and second transducers positioned along a first axis; and third and fourth transducers positioned along a second axis, the first and second axes being at least substantially orthogonal, wherein each of the first, second, third, and fourth transducers are configured in a transmit mode to transmit a measurement signal and in a receive mode to receive the measurement signal, wherein the rain gauge comprises:
(a) an inlet for receiving precipitation;
(b) an outlet for removing precipitation;
(c) a first conduit in communication with the inlet; and
(d) a second conduit in communication with the outlet, wherein adjacent ends of the first and second conduits are spaced from one another and wherein at least one of the following is true:
  (i) the adjacent ends of the first and second conduits are angled relative to a selected horizontal plane; and
  (ii) the second conduit comprises a longitudinal slot extending downwardly from the end of the second conduit.

* * * * *